(12) United States Patent
Auer

(10) Patent No.: US 8,260,208 B2
(45) Date of Patent: Sep. 4, 2012

(54) RADIO CHANNEL ESTIMATOR

(75) Inventor: Gunther Auer, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 322 days.

(21) Appl. No.: 12/570,297

(22) Filed: Sep. 30, 2009

(65) Prior Publication Data

US 2010/0087151 A1   Apr. 8, 2010

(30) Foreign Application Priority Data

Sep. 30, 2008 (EP) .................................. 08017236

(51) Int. Cl.
*H04B 17/00* (2006.01)
(52) U.S. Cl. ................ 455/67.11; 455/63.1; 455/67.13; 455/450; 455/452.1; 455/562.1; 455/501; 455/575.7; 370/329; 370/342
(58) Field of Classification Search ............... 455/67.11, 455/63.1, 67.13, 450, 452.1, 562.1, 501, 455/575.7; 370/329, 342
See application file for complete search history.

(56) References Cited

U.S. PATENT DOCUMENTS

| | | | | |
|---|---|---|---|---|
| 7,505,529 B2 * | 3/2009 | Kwak et al. | ..................... | 375/295 |
| 7,609,774 B2 * | 10/2009 | Horng et al. | ................... | 375/260 |
| 7,697,622 B2 * | 4/2010 | Han et al. | ...................... | 375/260 |
| 7,839,945 B2 * | 11/2010 | Khojastepour et al. | ....... | 375/267 |
| 7,917,176 B2 * | 3/2011 | Khojastepour et al. | .... | 455/562.1 |
| 7,933,357 B2 * | 4/2011 | Mazzarese et al. | ........... | 375/299 |
| 7,949,378 B2 * | 5/2011 | Liu et al. | ..................... | 455/575.1 |
| 8,098,746 B2 * | 1/2012 | Kim et al. | ..................... | 375/260 |
| 8,098,755 B2 * | 1/2012 | Kim et al. | ..................... | 375/267 |

FOREIGN PATENT DOCUMENTS

| JP | 2004-080110 A | 3/2004 |
|---|---|---|
| JP | 2007-208719 A | 8/2007 |

OTHER PUBLICATIONS

I. E. Telatar, Capacity of Multi-Antenna Gaussian Channels, European Trans. Telecommun., vol. 10, pp. 585-595, Nov. 1999.
G. J. Foschini and M. J. Gans, On Limits of Wireless Communications in a Fading Environment when using Multiple Antennas, Wireless Personal Communications, vol. 6, pp. 311-335, 1998.

(Continued)

*Primary Examiner* — Marceau Milord
(74) *Attorney, Agent, or Firm* — Nutter McClennen & Fish LLP; John J. Penny, Jr.; Christina M. Sperry

(57) ABSTRACT

Radio channel estimators are provided. In an exemplary embodiment, a radio channel estimator is provided for estimating a first radio channel to obtain a first estimate, the first radio channel being comprised in a multiple input multiple output (MIMO) radio channel extending between at least a first transmit antenna and a second transmit antenna and a receive antenna, the first radio channel extending between the first transmit antenna and the receive antenna. The estimator comprises a means for receiving a reference symbol transmitted by the second transmit antenna and a means for estimating a second radio channel based on the reference symbol, the second radio channel extending between the second transmit antenna and the receive antenna. The estimator further comprises a means for processing the estimate of the second radio channel based on a spatial property of the MIMO radio channel to obtain the first estimate.

20 Claims, 11 Drawing Sheets

OTHER PUBLICATIONS

IEEE 802.11n, cf. R. Van Nee, V. K. Jones, G. Awater, A. Van Zelst, J. Gardner and G. Steele, The 802.11n MIMO-OFDM standard for wireless LAN and beyond, Wireless Personal Communications, vol. 37, pp. 445-453, May 2006.

Beyond 3rd generation (B3G) mobile communication systems, cf. M. Tanno, Y. Kishiyama, N. Miki, K. Higuchi, and M. Sawahashi, Evolved UTRA—physical layer overview, in Proc. IEEE Workshop Signal Processing Advances Wireless Commun. (SPAWC 2007), Helsinki, Finland, pp. 1-8, Jun. 2007.

J. K. Cavers, An Analysis of Pilot Symbol Assisted Modulation for Rayleigh Fading Channels, IEEE Trans. Vehic. Technol., vol. VT-40, pp. 686-693, Nov. 1991.

P. Hoher, S. Kaiser, and P. Robertson, Pilot-Symbol-Aided Channel Estimation in Time and Frequency, in Proc. Communication Theory Mini-Conf. (CTMC) within IEEE Global Telecommun. Conf. (Globecom'97), Phoenix, USA, pp. 90-96, 1997.

G. Auer, Analysis of Pilot-Symbol Aided Channel Estimation for OFDM Systems with Multiple Transmit Antennas, in Proc. IEEE Int. Conf. Commun. (ICC 2004), Paris, France, pp. 3221-3225, Jun. 2004.

M. Stege, P. Zillmann, and G. Fettweis, MIMO Channel Estimation with Dimension Reduction, in Proc. Int. Symp. Wireless Pers. Multimedia Commun. (WPMC 2002), Hawaii, USA, Oct. 2002.

H. Miao and M. J. Juntti, Space-Time Channel Estimation and Performance Analysis for Wireless MIMO-OFDM Systems With Spatial Correlation, IEEE Trans. Vehic. Technol., vol. 54, pp. 2003-2016, Nov. 2005.

J. Wang and K. Araki, Pilot Symbol Aided MAP-Based 3D Channel for Multi-User MIMO-OFDM Systems, IEICE Trans. Commun., vol. E89-B, pp. 801-808, Mar. 2006.

J.-W. Choi and Y.-H. Lee, Complexity-Reduced Channel Estimation in Spatially Correlated MIMO-OFDM Systems, IEICE Trans. Commun., vol. E90-B, pp. 2609-2612, Sep. 2007.

D. Hammarwall and B. Ottersten, Spatial Transmit Processing using Long-Term Channel Statistics and Pilot Signaling on Selected Antennas, in Proc. ASILOMAR Conference on Signals, Systems & Computers, Pacific Grove, USA, Nov. 2006.

IEEE Trans. Broadcasting, vol. 46, pp. 128-133, Jun. 2000.

J. Salz and J. Winters, Effect of fading correlation on adaptive arrays in digital mobile radio, IEEE Trans. Vehic. Technol., vol. 43, pp. 1049-1057, Nov. 1994.

Z. Wang and G. B. Giannakis, Wireless Multicarrier Communications—Where Fourier Meets Shannon, IEEE Signal Proc. Mag., vol. 17, pp. 29-48, May 2000.

C.-T. Lam, G. Auer, F. Danilo-Lemoine, and D. Falconer, Design of Time and Frequency Domain Pilots for Generalized Multicarrier Systems, in Proc. IEEE Int. Conf. Commun. (ICC 2007), Glasgow, UK, Jun. 2007.

Y. Li, Pilot-Symbol-Aided Channel Estimation for OFDM in Wireless Systems, IEEE Trans. Vehic. Technol., vol. 49, pp. 1207-1215, Jul. 2000.

J. Choi and Y. Lee, Optimum Pilot Pattern for Channel Estimation in OFDM Systems, IEEE Trans. Wireless Commun., vol. 4, pp. 2083-2088, Sep. 2005.

F. Sanzi and J. Speidel, An Adaptive Two-Dimensional Channel Estimator for Wireless OFDM with Application to Mobile DVB-T, IEEE Trans. Broadcasting, vol. 46, pp. 128-133, Jun. 2000.

I. Barhumi, G. Leus, and M. Moonen, Optimal training design for MIMO OFDM systems in mobile wireless channels, Signal Processing, IEEE Transactions on, vol. 51, pp. 1615-1624, Jun. 2003.

W. G. Jeon, J. H. Paik, and Y. S. Cho, Two Dimensional MMSE (MMSE=Minimum Mean Square Error) Channel Estimation for OFDM Systems with Transmitter Diversity, in Proc. IEEE Vehic. Technol. Conf. 2001-Fall (VTC'F01), Atlantic City, USA, Oct. 2001.

G. Auer, Channel Estimation for OFDM Systems with Multiple Transmit Antennas by Filtering in Time and Frequency, in Proc. IEEE Vehic. Technol. Conf. 2003-Fall (VTC'F03), Orlando, USA, Oct. 2003.

Japanese Office Action Application No. 2009-224427, mailed Aug. 23, 2011.

* cited by examiner

RADIO CHANNEL ESTIMATOR

FIELD OF THE INVENTION

The present invention is in the field of radio channel estimation as carried out in radio systems as, for example, mobile communication systems utilizing multiple transmission antennas.

BACKGROUND

Radio channel estimation is, for example, used in conventional mobile communication systems, wherein known symbols, also called reference or pilot symbols, are transmitted from a transmitter to a receiver and the receiver estimates the radio channel based on the knowledge of the reference symbols. As the receiver knows when and how such a reference symbol is transmitted, the radio channel can be estimated and based on the radio channel estimation, data can be detected eliminating or reducing the effects of the radio channel.

Systems employing multiple transmit and receive antennas, known as multiple input multiple output (MIMO=Multiple Input Multiple Output) systems, promise significant gains in channel capacity, cf. I. E. Telatar, Capacity of Multi-Antenna Gaussian Channels, European Trans. Telecommun., vol. 10, pp. 585-595, November 1999, and G. J. Foschini and M. J. Gans, On Limits of Wireless Communications in a Fading Environment when using Multiple Antennas, Wireless Personal Communications, vol. 6, pp. 311-335, 1998.

Together with orthogonal frequency division multiplexing (OFDM=Orthogonal Frequency Division Multiplexing), MIMO-OFDM is e.g. selected for the wireless local area network (WLAN=Wireless Local Area Network) standard IEEE 802.11n, cf. R. Van Nee, V. K. Jones, G. Awater, A. Van Zelst, J. Gardner and G. Steele, The 802.11n MIMO-OFDM standard for wireless LAN and beyond, Wireless Personal Communications, vol. 37, pp. 445-453, May 2006, and for beyond $3^{rd}$ generation (B3G) mobile communication systems, cf. M. Tanno, Y. Kishiyama, N. Miki, K. Higuchi, and M. Sawahashi, Evolved UTRA—physical layer overview, in Proc. IEEE Workshop Signal Processing Advances Wireless Commun. (SPAWC 2007), Helsinki, Finland, pp. 1-8, June 2007.

Transmitting a radio signal over a multipath fading channel, the received signal will have unknown amplitude and phase variations. In order to coherently detect the received signal, an accurate channel estimate is essential. The most common technique to obtain channel state information is via pilot aided channel estimation (PACE=Pilot Aided Channel Estimation), where known training symbols, using known transmission resources as known time slots or frequencies, termed pilots, are multiplexed with data. If the spacing of the pilots is sufficiently close to satisfy the sampling theorem, channel estimation and interpolation for the entire data sequence is possible. In this context the term spacing refers to time spacing as well as frequency spacing. The separation of pilot symbols is generally chosen less than a coherence time or coherence bandwith of a radio channel, in order to enable interpolation between two pilot symbols in the time and/or frequency domain.

Channel estimation by interpolation of a one dimensional (1D=One Dimensional) signal stream of time domain samples was e.g. devised by Cavers, cf. J. K. Cavers, An Analysis of Pilot Symbol Assisted Modulation for Rayleigh Fading Channels, IEEE Trans. Vehic. Technol., vol. VT-40, pp. 686-693, November 1991. For OFDM the received signal is correlated in two dimensions (2D=Two Dimensional), i.e. time and frequency, allowing for 2D channel estimation by interpolation in time and frequency, cf. P. Höher, S. Kaiser, and P. Robertson, Pilot-Symbol-Aided Channel Estimation in Time and Frequency, in Proc. Communication Theory Mini-Conf. (CTMC) within IEEE Global Telecommun. Conf. (Globecom '97), Phoenix, USA, pp. 90-96, 1997.

As multiple signals are transmitted from different transmit antennas simultaneously, coherent detection requires accurate channel estimates of all transmit antennas' signals at the receiver. If the transmit antennas are mutually uncorrelated, the resources consumed by pilot symbols grow in proportion to the number of transmit antennas, compare G. Auer, Analysis of Pilot-Symbol Aided Channel Estimation for OFDM Systems with Multiple Transmit Antennas, in Proc. IEEE Int. Conf. Commun. (ICC 2004), Paris, France, pp. 3221-3225, June 2004, as shown in FIG. 9.

FIG. 9 shows a conventional pilot design scheme. Two-dimensional pilot grids are applied to a MIMO-OFDM system in a way that each transmit antenna is assigned one orthogonal pilot grid. FIG. 9 shows three transmit antennas 910, 920 and 930. Through each of the three transmit antennas, an orthogonal pilot grid is transmitted, which is indicated by a layer of transmission resources illustrated on the left-hand side of the transmit antennas in FIG. 9. A layer of transmission resources is sub divided in a grid along the time dimension and the frequency dimension. For example, layer 940, which is transmitted on transmit antenna 930, comprises multiple sub carriers indicated along the frequency axis and multiple time slots indicated along the time axis, which are defined by the Cartesian coordinate system 950.

Different colored cubes, wherein the legend illustrates the corresponding assignment, indicate the type of transmission within the transmission grid. Empty cubes correspond to no transmission, gray cubes correspond to data transmission and black cubes correspond to pilot or reference symbol transmission. As can be seen from the layer 940, pilot symbols have a spacing of $D_t$ along the time axis, $D_f$ along the frequency axis and $D_s$ along the space axis, i.e. in the conventional scheme, pilot symbols are transmitted on each transmit antenna. This provides a disadvantage, as pilot symbols consume valuable transmission resources and transmission resources are not utilized effectively.

On the other hand, spatial correlation between antennas may be utilized to improve the accuracy of the channel estimates, cf. M. Stege, P. Zillmann, and G. Fettweis, MIMO Channel Estimation with Dimension Reduction, in Proc. Int. Symp. Wireless Pers. Multimedia Commun. (WPMC 2002), Hawaii, USA, October 2002.

H. Miao and M. J. Juntti, Space-Time Channel Estimation and Performance Analysis for Wireless MIMO-OFDM Systems With Spatial Correlation, IEEE Trans. Vehic. Technol., vol. 54, pp. 2003-2016, November 2005, disclose channel estimation in multiple input multiple output (MIMO) orthogonal frequency division multiplexing (OFDM) systems with correlation at the receive antenna array. A two-step channel estimation algorithm is proposed. Firstly, the iterative quadrature maximum likelihood based time delay and spatial signature estimation is presented by utilizing special training signals with a cyclic structure. The receive spatial correlation matrix of the vector valued channel impulse response is formulated as a function of the spatial signature, the time delay, and the pulse shaping filter.

The joint spatio-temporal (JST) filtering based minimum mean squared error channel estimator is derived by virtue of the spatial correlation. In addition, the effect of channel estimation errors on the bit error probability performance of the space-time block coded OFDM system over correlated MIMO channels is derived. The Cramer-Rao lower bound on the time delay estimate is provided for a benchmark of the performance comparison. The performance of proposed algorithms is illustrated based on analysis and computer simulations. The JST channel estimator achieves gains in the mean squared error compared to the temporal filtering. It also enables savings in the pilot symbol power level.

Other related prior art can be found in J. Wang and K. Araki, Pilot Symbol Aided MAP-Based 3D Channel for Multi-User MIMO-OFDM Systems, IEICE Trans. Commun., vol. E89-B, pp. 801-808, Mar. 2006, and J.-W. Choi and Y.-H. Lee, Complexity-Reduced Channel Estimation in Spatially Correlated MIMO-OFDM Systems, IEICE Trans. Commun., vol. E90-B, pp. 2609-2612, September 2007. However, much of the attainable gains of employing multiple antennas may be cancelled out by the increased pilot overhead, particulary if the number of transmit antennas is high.

D. Hammarwall and B. Ottersten, Spatial Transmit Processing using Long-Term Channel Statistics and Pilot Signaling on Selected Antennas, in Proc. ASILOMAR Conference on Signals, Systems & Computers, Pacific Grove, USA, November 2006 considers the generation of a channel quality indicator (CQI) to be fed back to a transmitter based on pilot symbols, that are inserted on a subset of transmit antennas.

SUMMARY

It is the objective of the present invention to provide a more efficient concept for channel estimation utilizing pilot symbols in a MIMO radio system.

A first aspect of the invention is related to a radio channel estimator for estimating a first radio channel to obtain a first radio channel estimate, the first radio channel being comprised in a multiple input multiple output (MIMO=multiple input multiple output) radio channel, the MIMO radio channel extending between at least a first transmit antenna, a second transmit antenna and a receive antenna, the first radio channel extending between the first transmit antenna and the receive antenna. The radio channel estimator can include a receiver for receiving a reference symbol transmitted by the second transmit antenna, an estimator for estimating a second radio channel based on the reference symbol, the second radio channel extending between the second transmit antenna and the receive antenna, and a processor for processing the estimate of the second radio channel based on a spatial property of the MIMO radio channel to obtain the first radio channel estimate. A second aspect of the invention is related to a method for estimating a first radio channel to obtain a first radio channel estimate, the first radio channel being comprised in a MIMO radio channel extending between at least a first transmit antenna, a second transmit antenna and a receive antenna, the first radio channel extending between the first transmit antenna and the receive antenna. The method can include receiving a reference symbol transmitted by the second transmit antenna, estimating a second radio channel based on the reference symbol, the second radio channel extending between the second transmit antenna and the receive antenna, and processing the estimate of the second radio channel based on a spatial property of the MIMO radio channel to obtain the first radio channel estimate. A third aspect of the invention is related to a transmitter apparatus for enabling radio channel estimation of a MIMO radio channel, the MIMO radio channel extending between at least a first transmit antenna, a second transmit antenna and a receive antenna, the MIMO radio channel having a coherence time, a coherence bandwidth and a coherence length, the spacing between the first transmit antenna and the second transmit antenna being less than the coherence length. The transmitter apparatus can include a transmitter for transmitting a first reference symbol on the first transmit antenna at a first time instant on a carrier frequency and for transmitting a second reference symbol on the second transmit antenna at a second time instant on the carrier frequency. The first and the second time instants are separated by more than the coherence time and transmission of reference symbols on the first transmit antenna and on the second transmit antenna is suspended between the first and the second time instants and within the coherence bandwidth from the carrier frequency. A fourth aspect of the invention is related to a method for enabling radio channel estimation of a MIMO radio channel, the MIMO radio channel extending between at least a first transmit antenna, a second transmit antenna and a receive antenna, the MIMO radio channel having a coherence time, a coherence bandwidth and a coherence length, the spacing between the first transmit antenna and the second transmit antenna being less than the coherence length. The method can include transmitting a first reference symbol on the first transmit antenna at a first time instant on a carrier frequency, and transmitting a second reference symbol on the second transmit antenna at a second time instant on the carrier frequency. The first and the second time instants are separated by more than the coherence time and transmission of reference symbols on the first transmit antenna and on the second transmit antenna is suspended between the first and the second time instants and within the coherence bandwidth from the carrier frequency.

The present invention is based on the finding that pilot aided channel estimation (PACE) for MIMO-OFDM transmitting over spatially correlated channels can be made more efficient by exploiting the correlation of the spatial channels for spatial radio channel estimation. The principle of channel estimation by interpolation can be extended to the spatial domain. When the channel responses of the transmit antennas are mutually correlated, pilot symbols may not be inserted for each transmit antenna and transmission resources may be saved for pilot symbols in favor for an enhanced data and system capacity. One finding of the present invention is that channel estimation can be carried out three-dimensionally (3D=Three Dimensional), e.g. by interpolation over time, frequency and space.

The present invention is based on the finding that spatial correlation can be utilized e.g. in order to interpolate between estimated spatial radio channels. In other words, in the spatial dimension of a MIMO radio channel, interpolation and/or prediction and/or extrapolation can be used to estimate a spatial radio channel at a location from which no reference symbols are provided, but to which a neighbor spatial radio channel, i.e. a radio channel to a neighbor location, is known and known to be correlated or related.

It is another finding of the present invention that pilot-aided channel estimation can be used for MIMO-OFDM transmitting over spatially correlated channels. Embodiments may extend the principle of channel estimation by interpolation in the spatial domain. Embodiments may provide the advantage of a higher system efficiency, which can be achieved by exploiting knowledge about channel responses of transmit antennas being mutually correlated, therewith saving transmission resources as less pilot symbols are necessary in order to estimate the radio channel. In other words, pilot symbols may not be inserted on each transmit antenna by embodiments of the present invention, i.e. a pilot grid can be adapted in a way that spatial radio channels may be interpolated.

Embodiments may carry out a three-dimensional interpolation over time, frequency and space. In other words, when pilot symbols are provided from one location or transmit antenna, the radio channel to another location or transmit antenna being different from the first location or transmit antenna may be estimated based on a known correlation.

Spatial correlation between transmit antennas may be utilized by embodiments to reduce the pilot overhead. Pilot symbols may only be inserted at a selected sub set of transmit antennas. In other words, if the channel response on a set of transmit antennas is known, the spatial correlation can be exploited to retain the channel response for all transmit antennas, e.g. by means of interpolation. In other embodiments, means of prediction and/or extrapolation may be utilized as well. Channel estimation by interpolation in time and in frequency may be extended by embodiments of the present invention to interpolation in the spatial domain, resulting, for example, in three-dimensional pilot-aided channel estimation.

Embodiments may provide the advantage of enabling less overhead due to pilots compared to conventional pilot grids, for example, for MIMO-OFDM systems, where one two-dimensional pilot grid may be inserted for each transmit antenna. Using a three-dimensional pilot grid may reduce the pilot overhead significantly in embodiments, especially when a number of transmit antennas is large.

Embodiments may therewith also provide the advantage of being able to flexibly support a large number of transmit antennas, taking advantage of spatial correlation. As the spatial correlation relates to the angular spread or the angle of departure (AoD=Angle of Departure) being sufficiently narrow, more than four transmit antennas may, for example, be supported e.g. in LTE (LTE=Long Term Evolution) with only two pilot grids, cf. 3GPP TS 36.211 V8.2.0, 3rd Generation Partnership Project; Technical Specification Group Radio Access Network; Evolved Universal Terrestrial Radio Access (E-UTRA); Physical Channels and Modulation (Release 8), tech. rep., March 2008. Hence, embodiments may provide the advantage that the numbers of transmit antennas may be increased without modifying the mapping of downlink reference symbols in LTE.

Embodiments may further provide the advantage that channel quality information (CQI=Channel Quality Information) and channel state information (CSI=Channel State Information) can be made available over the whole band. For example, for spatial pre-coding and link adaptation channel knowledge in the form of CSI or CQI over the entire frequency band may be made available at the transmitter. Embodiments carrying out a three-dimensional pilot grid may facilitate bandwidth efficient estimation of CSI and CQI at the receiver, which may then be fed back to the transmitter.

BREIF DESCRIPTION OF THE DRAWINGS

Embodiments of the present invention will be detailed using the accompanying Figs., in which FIG. 1a illustrates an embodiment of a radio channel estimator;

DESCRIPTION OF EMBODIMENTS

Figure 1A:
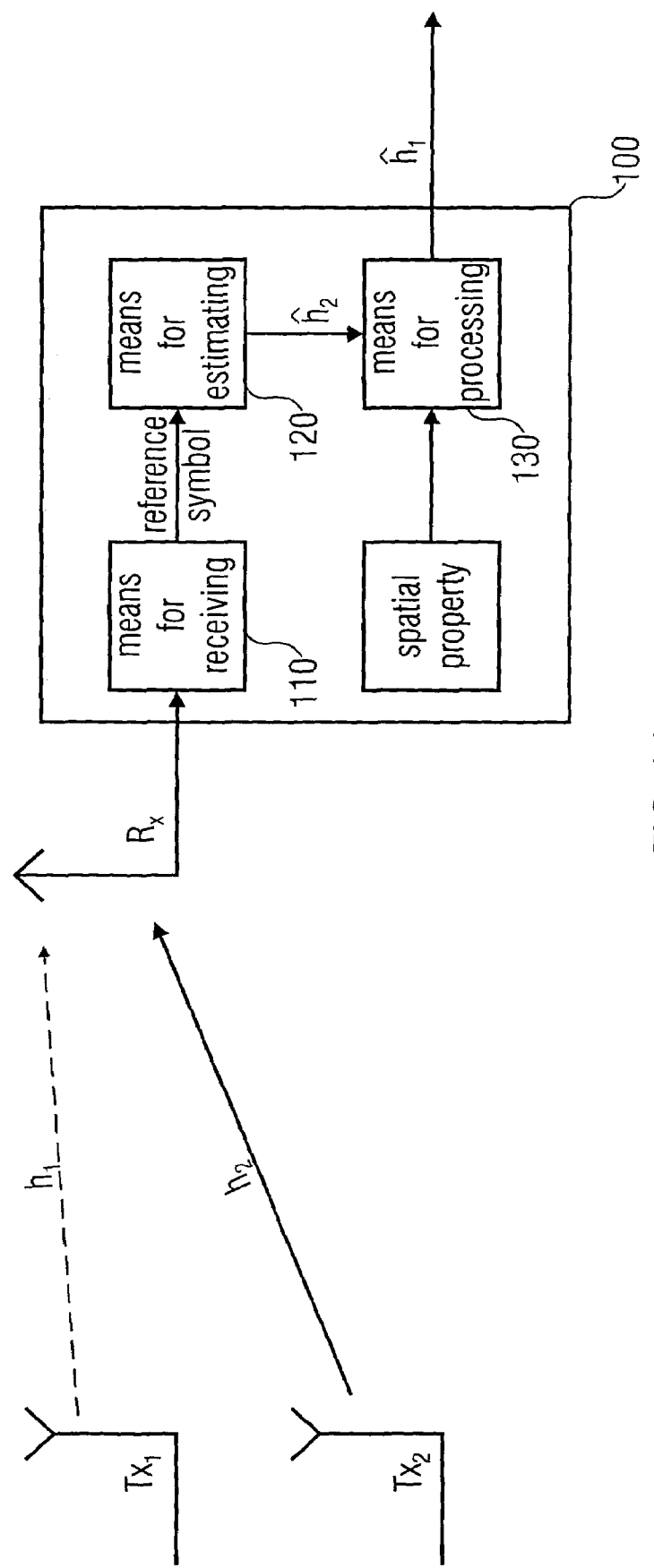
FIG. 1b illustrates another embodiment of a radio channel estimator.
FIG. 1c illustrates the concept of spatial interpolation.

FIG. 1a illustrates a radio channel estimator 100 for estimating a first radio channel $h_1$ to obtain a first radio channel estimate $\hat{h}_1$, the first radio channel $h_1$ being comprised in a multiple input multiple output (MIMO=Multiple Input Multiple Output) radio channel, the MIMO radio channel extending between at least a first transmit antenna $Tx_1$, a second transmit antenna $Tx_2$ and a receive antenna Rx, the first radio channel $h_1$ extending between the first transmit antenna $Tx_1$ and the receive antenna Rx. The radio channel estimator 100 comprises a means 110 for receiving a reference symbol transmitted by the second transmit antenna $Tx_2$. In embodiments the means 110 for receiving may comprise the receive antenna Rx or one or more receive antennas, and means for receiving and detecting the reference symbol.

The radio channel estimator 100 comprises a means 120 for estimating a second radio channel $\hat{h}_2$ based on the reference symbol, the second radio channel $h_2$ extending between the second transmit antenna $Tx_2$ and the receive antenna Rx. The radio channel estimator further comprises a means 130 for processing the estimate $\hat{h}_2$ of the second radio channel based on a spatial property of the MIMO radio channel to obtain the first radio channel estimate $\hat{h}_1$.

Although, the first and second radio channels $h_1$ and $h_2$ may be different, the known spatial property allows in embodiments the means 130 for processing to obtain the first radio channel estimate $\hat{h}_1$.

The spatial property of the MIMO radio channel may correspond to knowledge about the spatial correlation properties as, for example, in terms of a spatial correlation function or correlation matrix for the antennas, an auto-correlation matrix or any coupling measure determining any connection or dependency between the first and the second spatial radio channels $h_1$ and $h_2$. In embodiments, the means 130 for processing may carry out a prediction and/or extrapolation for the first radio channel $\hat{h}_1$ on the basis of the knowledge of the estimate for the second radio channel $\hat{h}_2$ and the spatial property. In other words, embodiments may utilize prediction and/or extrapolation methods for spatial channel estimation. In other embodiments, means of interpolation may be utilized.

Figure 1B:
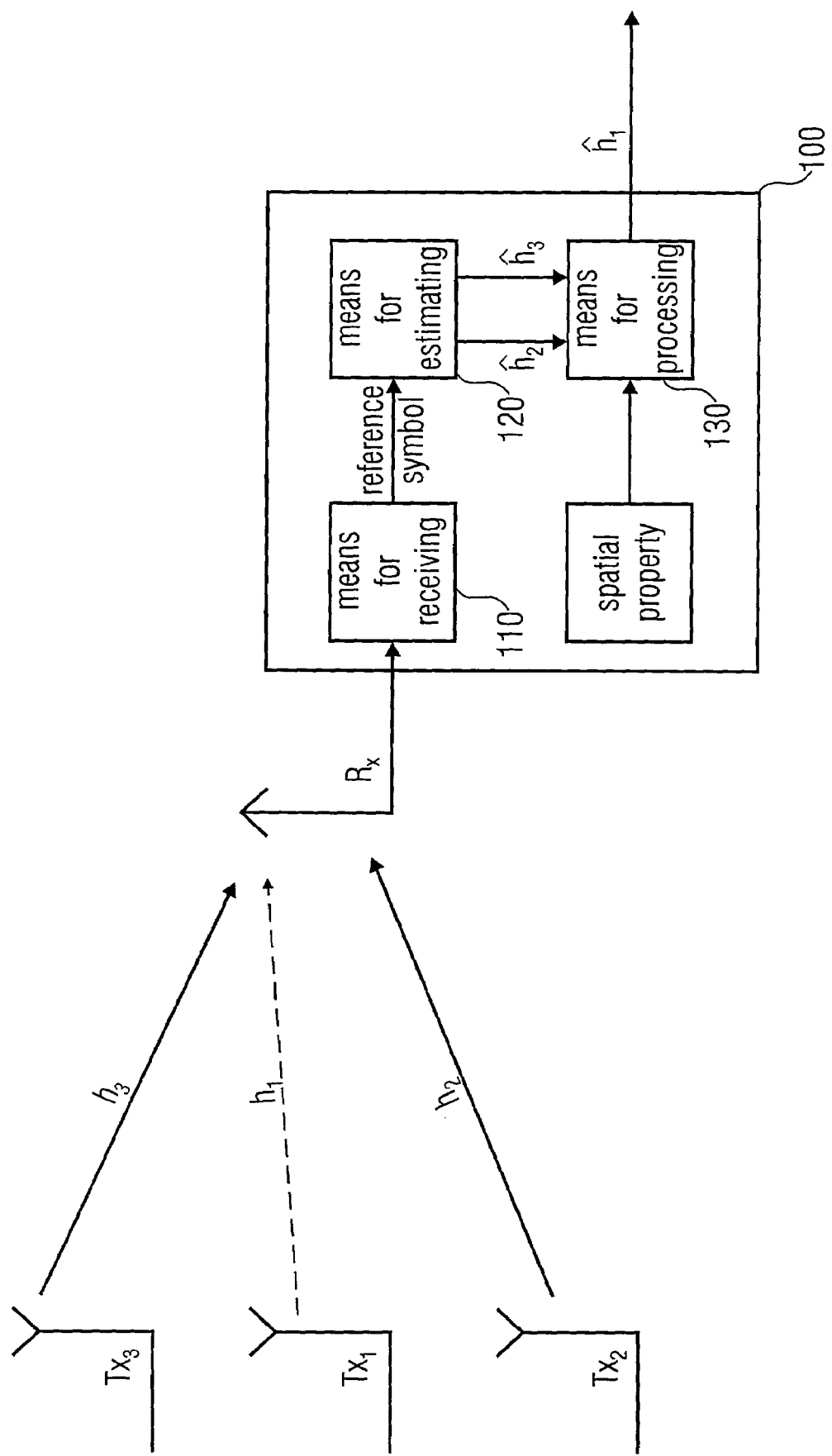

FIG. 1b shows another embodiment of a radio channel estimator 100 in which similar components as compared with FIG. 1a have similar reference signs. In the embodiment depicted in FIG. 1b, a third transmit antenna $Tx_3$ is involved to transmit a further reference symbol along a third radio channel $h_3$, extending between the transmit antenna $Tx_3$ and the receive antenna Rx. In the embodiment depicted in FIG. 1b, the means 110 for receiving is adapted for receiving the further reference symbol from the third transmit antenna $Tx_3$. Moreover, the means 120 for estimating is adapted for estimating the third radio channel $\hat{h}_3$ based on the further reference symbol. Furthermore, in the embodiment, the means 130 for processing is adapted for processing the estimate $\hat{h}_2$ of the second radio channel and the estimate $\hat{h}_3$ of the third radio channel based on the spatial property of the MIMO radio channel to obtain the first channel estimate $\hat{h}_1$.

In embodiments, along the illustration of FIG. 1b, the spatial sub channel $h_1$ of the MIMO radio channel relating to transmit antenna $Tx_1$ may be estimated based on two neighboring channel estimates. In embodiments, this may be carried out by means of interpolation. In other words, in embodiments, the means 130 for processing can be adapted for interpolating between the estimate $\hat{h}_2$ of the second radio channel and the estimate $\hat{h}_3$ of the third radio channel in order to obtain the estimate of the first radio channel $\hat{h}_1$.

Figure 1C:
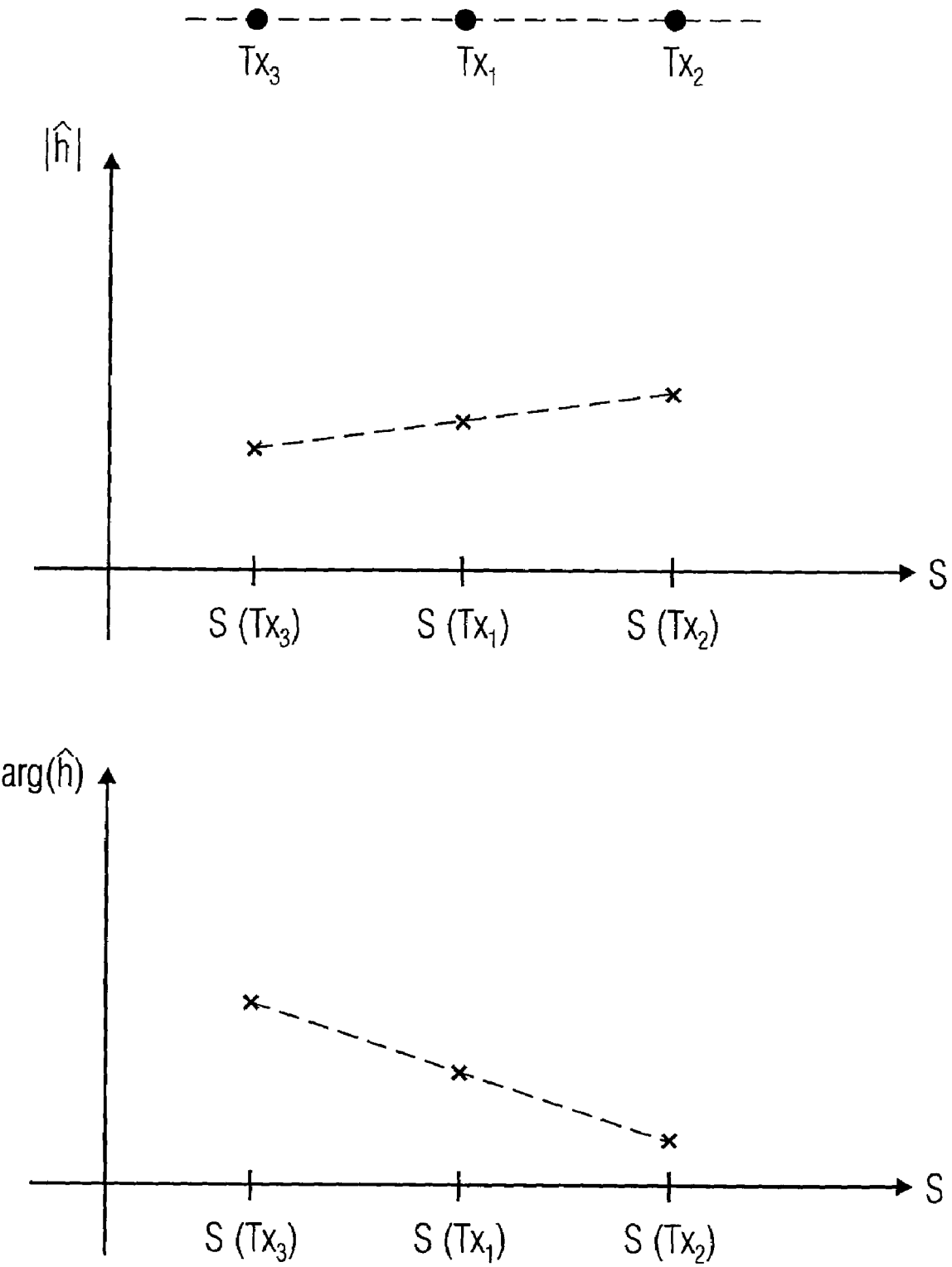

FIG. 1c illuminates the interpolation as possibly carried out in embodiments by the means 130 for processing. FIG. 1c shows the three transmit antennas $Tx_1$, $Tx_2$ and $Tx_3$ at the top, where the first transmit antenna $Tx_1$ is located between the other two transmit antennas $Tx_2$ and $Tx_3$. According to the above, it is assumed that radio channel estimates for the second and the third radio channels $\hat{h}_2$ and $\hat{h}_3$ are available. FIG. 1c illustrates two view graphs, one with respect to the magnitude $|\hat{h}|$ of a complex channel estimate $\hat{h}$ and the other one with respect to the argument of the complex channel estimate $\arg(\hat{h})$. In FIG. 1c, two view graphs show the spatial dimension on their abscissa along the extent of the three transmit antennas. In other words, in embodiments, a uniform linear array of transmit antennas may be assumed, for which a spatial channel estimate of a transmit antenna may be determined by interpolation of the channel estimates of its neighboring antennas.

FIG. 1c illustrates an embodiment having of a linear interpolation, i.e. the channel estimates of the estimated radio channels can be linearly connected and the interpolation value of the antenna in-between can be read off from the corresponding view charts with respect to the magnitude as well as to the argument of the radio channel to be estimated.

Figure 2:
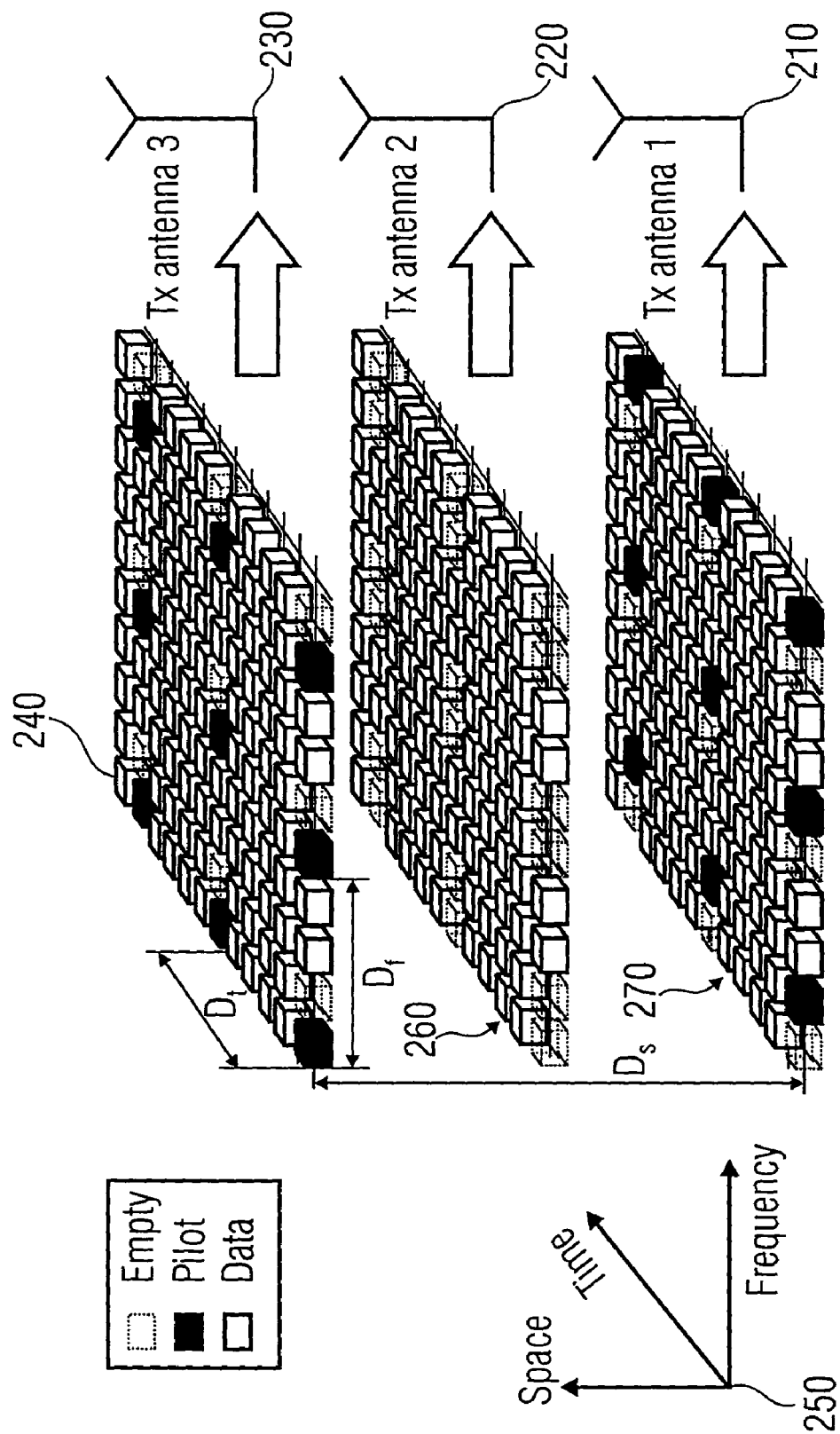
FIG. 2 illustrates a three-dimensional pilot grid used in an embodiment.
Figure 9:
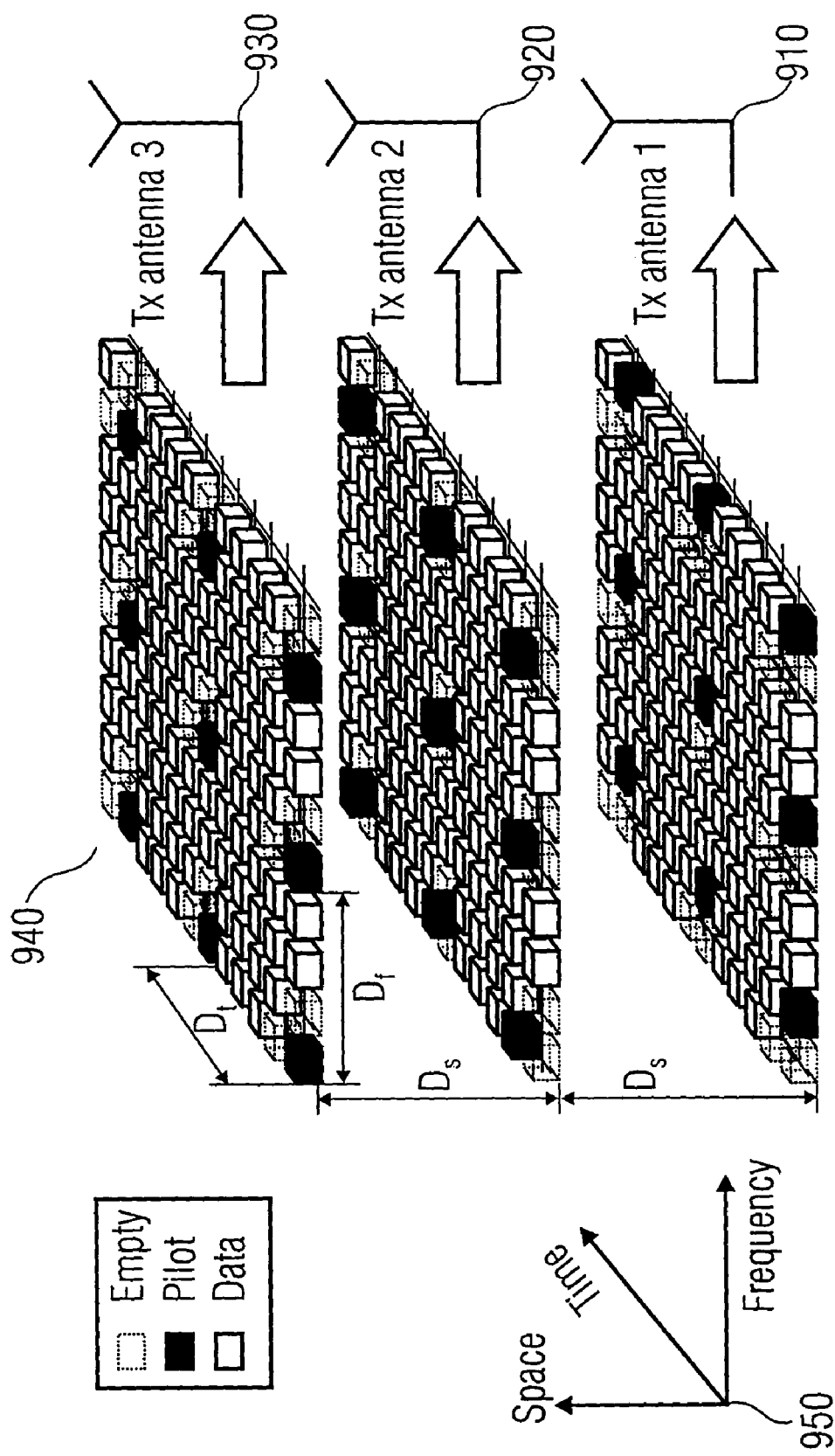
FIG. 9 illustrates a state-of-the-art two-dimensional pilot grid.

FIG. 2 illustrates a pilot grid used in an embodiment with three transmit antennas 210, 220 and 230. FIG. 2 illustrates a layer of pilot grids 240 at the top. The dimensions in FIG. 2 are determined by the coordinate system 250. Corresponding to the description of FIG. 9, FIG. 2 shows the transmission resources transmitted through transmit antenna 230 in the illustration 240. Again, cubes without filling indicate empty transmission resources, black cubes indicate pilot or reference symbols and gray cubes indicate data transmission. It can be seen that in the layer 240, the pilot symbols have a spacing of $D_t$ in the time dimension and $D_f$ in the frequency dimension. FIG. 2 illustrates two more layers 260 and 270.

Layer 260 illustrates the signals transmitted through transmit antenna 220. As can be seen from FIG. 2, there are no pilot symbols transmitted through antenna 220 in the present embodiment. This is because the spatial spacing $D_s$ is larger than, for example, in the conventional system illustrated in FIG. 9. Layer 270 is transmitted through transmit antenna 210, which comprises pilot symbols with the same spacing as the ones in layer 240. As illustrated in FIG. 2, no pilot symbols are transmitted on transmit antenna 220. However, since the spatial channels are correlated, the radio channel from transmit antenna 220 can be interpolated.

FIG. 2 illustrates the overhead reduction due to utilization of the correlation of the spatial MIMO radio channel. Compared to the conventional pilot grid for MIMO-OFDM as shown in FIG. 9, where a two-dimensional pilot grid is inserted for each transmit antenna, the embodiment illustrated in FIG. 2 utilizes a three-dimensional pilot grid, wherein the pilot overhead can be significantly reduced as shown using the example of transmit antenna 220. It is to be noted that the more transmit antennas a system may utilize, the higher the saving of embodiments can be.

In embodiments provided with sufficient spatial correlation, a larger number of transmit antennas may flexibly be supported. For example, in LTE, cf. 3GPP TS 36.211 V8.2.0, 3rd Generation Partnership Project; Technical Specification Group Radio Access Network; Evolved Universal Terrestrial Radio Access (E-UTRA); Physical Channels and Modulation (Release 8), tech. rep., March 2008, more than four transmit antennas may be supported with only two pilot grids.

Embodiments may consequently also comprise transmitter for enabling radio channel estimation of a MIMO radio channel, the MIMO radio channel extending between at least a first transmit antenna ($Tx_1$), a second transmit antenna ($Tx_2$) and a receive antenna (Rx), the MIMO radio channel having a coherence time, a coherence bandwidth and a coherence length, the spacing between the first transmit antenna ($Tx_1$) and the second transmit antenna being less than the coherence length.

In other words the MIMO radio channel having a time span, the coherence time, after which's expiration a channel impulse response has become completely independent or uncorrelated from a channel impulse response before said time spawn. Similarly, the MIMO radio channel having a bandwidth, the coherence bandwidth, where two channel impulse responses at two frequencies being separated by at least said bandwidth are completely independent or uncorrelated. Moreover, the MIMO radio channel having a length, i.e. a spatial distance, the coherence length, where two channel impulse responses at two locations being separated by at least said length or distance are completely independent or uncorrelated.

The embodiment of the transmitter comprising a means for transmitting a first reference symbol on the first transmit antenna ($Tx_1$) at a first time instant on a carrier frequency and a means for transmitting a second reference symbol on the second transmit antenna ($Tx_2$) at a second time instant on a carrier frequency, wherein the first and the second time instants are separated by more than the coherence time and transmission of reference symbols on the first transmit antenna ($Tx_1$) and on the second transmit antenna ($Tx_2$) is suspended between the first and the second time instants and within the coherence bandwidth from the carrier frequency.

In other words, embodiments may take advantage of the spatial property of the radio channel, e.g. a known correlation between the channel impulse responses of two radio channels between two transmit antennas and a receive antenna, by providing only one reference symbol for one radio channel on one transmit antenna within the coherence time and frequency of the MIMO radio channel, as the other radio channel can be determined on the basis of the spatial property. Respectively, embodiments may extend the above concept to a multiplicity of transmit and receive antennas.

Furthermore, embodiments may comprise a method for enabling radio channel estimation of a MIMO (MIMO=Multiple Input Multiple Output) radio channel, the MIMO radio channel extending between at least a first transmit antenna ($Tx_1$), a second transmit antenna ($Tx_2$) and a receive antenna (Rx), the MIMO radio channel having a coherence time, a coherence bandwidth and a coherence length, the spacing between the first transmit antenna ($Tx_1$) and the second transmit antenna being less than the coherence length. The method comprising the steps of transmitting a first reference symbol on the first transmit antenna ($Tx_1$) at a first time instant on a carrier frequency and transmitting a second reference symbol on the second transmit antenna ($Tx_2$) at a second time instant on the carrier frequency. The first and the second time instants are separated by more than the coherence time and transmission of reference symbols on the first transmit antenna ($Tx_1$) and on the second transmit antenna ($Tx_2$) is suspended between the first and the second time instants and within the coherence bandwidth from the carrier frequency.

As can be seen in FIG. 2, along the frequency axis, multiple reference symbols can be used. In other words, in embodiments, multiple sub carriers may be used per transmit antenna. In embodiments, the means 110 for receiving a reference symbol may be adapted for receiving the reference symbol on a first sub carrier. Accordingly, the means 120 for estimating the second radio channel can be adapted for estimating the second radio channel $\hat{h}_2$ based on the reference symbol on the first sub carrier. A sub carrier may for example be a sub carrier of an OFDM system, generally it may be any carrier of a multi-carrier system.

Moreover, the means 130 for processing can be adapted for processing the estimate $\hat{h}_2$ of the second radio channel based on a spatial property, as e.g. a correlation property or another spatial dependencies, of the MIMO radio channel to obtain the first radio channel estimate $\hat{h}_1$ on a second sub carrier. The second sub carrier may have a different frequency than the first sub carrier may for example be another sub carrier of an OFDM system, generally it may be any other carrier of a multi-carrier system.

In other words, in embodiments, a spatial MIMO radio sub channel may be interpolated from channel estimates from different frequencies. Accordingly, in embodiments, the means 110 for receiving a reference symbol may be adapted for receiving a reference symbol on a third sub carrier. The means 130 for processing can be adapted for processing channel estimates of a second and a third sub carrier in order to obtain the channel estimate of the first sub carrier. This can be carried out by means of interpolation. In other words, correlation in the spatial and in the frequency domain may be exploited jointly by embodiments.

In embodiments the means 110 can be adapted for receiving reference symbols on a multiplicity of sub carriers, the sub carriers having different sub carrier frequencies, and the means 120 for estimating can be adapted for estimating radio channels on the multiplicity of sub carriers. The means 130 for processing can be adapted for processing the estimates of the different sub carriers based on the spatial property of the MIMO radio channel to obtain the first radio channel estimate ($\hat{h}_1$) for a sub carrier on which no reference symbol is provided.

With respect to FIG. 2, it can be seen that on the layer 260, no pilot symbols are available. In other words, the spatial sub channels of layer 260 are interpolated from layers 270 and 240 in the embodiment of FIG. 2. However, layer 260 comprises sub carriers and time slots as well. In other words, in embodiments, the three-dimensional interpolation may be carried out, e.g. correlation in the spatial, frequency and time domain may be exploited jointly.

In embodiments, the means 110 for receiving a reference symbol may be adapted for receiving the reference symbol during a first time slot. The means 120 for estimating may be adapted for estimating the second radio channel based on the reference symbol received during the first time slot and the means 130 for processing may be adapted for processing the estimate of the second radio channel based on a spatial property of the MIMO radio channel to obtain the first radio channel estimate during a second time slot. In other words correlation in the time dimension and the spatial domain may be exploited jointly in embodiments.

Accordingly, the means 110 for receiving may be adapted for receiving another reference symbol during a third time slot, correspondingly, the means 120 for estimating can be adapted for estimating a third radio channel during the third time slot and the means 130 for processing can be adapted for processing the estimates of the first and third time slots in order to obtain the first radio channel estimate during the second time slot. Again, this may be carried out in terms of interpolation.

In embodiments the means 110 can be adapted for receiving reference symbols in a multiplicity of time slots and the means 120 can be adapted for estimating radio channels based on the multiplicity of reference symbols received in the multiplicity of time slots. The means 130 for processing can be adapted for processing the estimates of the multiplicity of radio channels based on the spatial property of the MIMO radio channel to obtain the first radio channel estimate $\hat{h}_1$ for a time slot for which no reference symbol was provided.

In other words, in embodiments, the means 130 for processing can be adapted for processing estimates of radio channels during different times, at different locations and at different sub carrier frequencies in order to estimate or interpolate the radio channels in-between in terms of a three-dimensional grid. In embodiments the three-dimensional grid may be dimensioned such that repetitive pilot symbols are available in domain spacings of which at least one is less than the respective domain coherence limits. In other words, pilot symbols may be repeated in the time domain at times less than the coherence time of the radio channel, enabling time domain interpolation. In other words, the average time spacing of the pilot or reference symbols may be below the coherence time. Alternatively or additionally pilot symbols may be repeated in the frequency domain at frequencies or sub carriers having spacings less than the coherence bandwidth of the radio channel, enabling frequency domain interpolation. Additionally according to embodiments pilot symbols may be repeated in the spatial domain at locations having spacings less than a coherence length of the radio channel enabling spatial domain interpolation. In embodiments, the three-dimensional grid may be regular or irregular, i.e. in each of the three dimensions, spacing of reference symbols may be equidistant or irregular.

Embodiments may provide a bandwidth efficient pilot design, which can e.g. be applicable for the wide area deployment scenario of the WINNER (WINNER=Wireless World Initiative New Radio) II system concept, cf. IST-4-027756 WINNER II, D6.13.10 final CG wide area description for integration into overall system concept and assessment of key technologies, October 2007. Moreover, possible applications may include LTE-Advanced, where the support of more than 4 transmit antennas without increasing the pilot overhead is appealing.

Moreover a possible application scenario may be an above rooftop deployment. In cellular networks, where antennas are typically mounted above rooftop, the spatial channel exhibits a narrow angular spread, which gives rice to spatial correlations between transmit antennas on the downlink, which can be beneficially exploited by embodiments. Furthermore, embodiments can be generally applicable to MIMO-OFDM schemes without spatial precoding, for instance spatial multiplexing or space-time block codes taking advantage of spatial correlation of transmit antennas.

Embodiments may also be applied in a scenario where a grid of beams is utilized, for example for WINNER wide area, cf. IST-4-027756 WINNER II, D6.13.10 final CG wide area description for integration into overall system concept and assessment of key technologies, October 2007, as well as for LTE closed loop single user MIMO, cf. 3GPP TS 36.211 V8.2.0, 3rd Generation Partnership Project; Technical Specification Group Radio Access Network; Evolved Universal Terrestrial Radio Access (E-UTRA); Physical Channels and Modulation (Release 8), tech. rep., March 2008. The possible spatial precoders can be selected from a set $B=\{B_1, \ldots, B_M\}$ of fixed matrices, where M denotes the number of available precoders.

The receiver can then easily determine the effective channel, i.e. the channel including the spatial processing, by receiving an unweighted 3D common pilot grid transmitted omni-directionally without spatial precoding, together with the beam index m associated to precoder $B_m \in B$. As control information is typically transmitted omni-directionally, e.g. as specified in LTE, cf. 3GPP TS 36.211 V8.2.0, 3rd Generation Partnership Project; Technical Specification Group Radio Access Network; Evolved Universal Terrestrial Radio Access (E-UTRA); Physical Channels and Modulation (Release 8), tech. rep., March 2008), the insertion of various pilot grids, i.e. dedicated and common pilots, is effectively avoided. Thus, the pilot overhead is further reduced.

Figure 3:
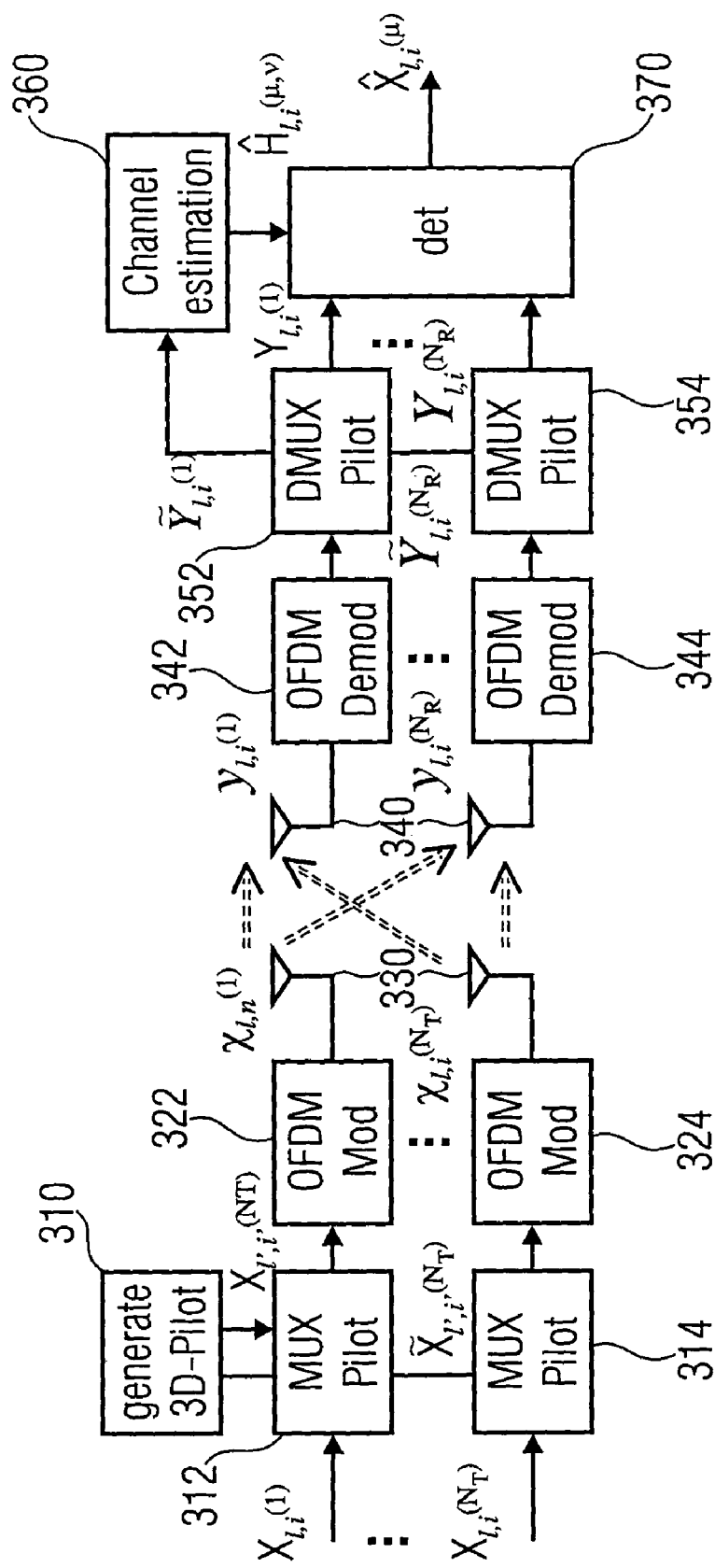
FIG. 3 illustrates an embodiment of an OFDM system.

FIG. 3 illustrates a MIMO-OFDM system. At the transmitter on the left-hand side, the three-dimensional pilot grid is generated, i.e. a grid of reference symbols extending in the time, the frequency and the spatial domain in the block 310. The generated three-dimensional pilot grid is then separated in the spatial domain, i.e. layers of time and frequency grids are assigned to the spatial transmission paths, which is carried out by the multiplexing entities 312 and 314. The multiplexing entities 312 and 314 multiplex the generated three-dimensional pilot grid with data for transmission, which is labeled $X_{l,i}^{(1)} \ldots X_{l,i}^{(N_T)}$ to obtain data symbols including pilot symbols $\tilde{X}_{l,i}^{(1)} \ldots \tilde{X}_{l,i}^{(N_T)}$. OFDM modulation is then carried out in blocks 322 and 324 before the corresponding time domain signals $x_{l,i}^{(1)} \ldots x_{l,i}^{(N_T)}$ are transmitted on the $N_T$ transmission antennas 330.

FIG. 3 shows, on the receiver side $N_R$ receive antennas 340, which are connected to OFDM demodulation entities 342 and 344 to which the receive signals $y_{l,i}^{(1)} \ldots y_{l,i}^{(N_R)}$ are provided and which generate the frequency domain signals $\tilde{Y}_{l,i}^{(1)} \ldots \tilde{Y}_{l,i}^{(N_R)}$. Two de-multiplexing entities 352 and 354 extract the pilot symbols from the received signals and provide them to the channel estimation entity 360, which may comprise a radio channel estimator 110 according to the above description. Once the channel estimation entity 360 has estimated the channel, the detector and estimator 370 may determine an estimation $\hat{X}_{l,i}^{(1)} \ldots \hat{X}_{l,i}^{(N_T)}$ for the transmitted signals.

In the following, a more detailed system and channel model will be provided.

In the following an embodiment in a MIMO-OFDM system with $N_T$ transmit and $N_R$ receive antennas as illustrated in FIG. 3 is considered. Denote with $N_c$ the number of used sub carriers, and with L being the number of OFDM symbols per frame. The transmit signal vector $x_{n,l} = [X_{n,l}^{(1)}, \ldots, X_{n,l}^{(N_T)}]^T$ is emitted by an antenna array with $N_T$ elements, which may or may not include transmit beam-forming. The total transmit power is set to $E\{\|x_{n,l}\|^2\} = E_d$. OFDM modulation is performed by $N_{DFT}$-point ($N_{DFT} \geq N_c$) inverse DFT (IDFT, DFT=Discrete Fourier Transform), followed by insertion of a cyclic prefix (CP=Cyclic Prefix) of $N_{CP}$ samples. Assuming perfect orthogonality in time and frequency, the received signal of sub carrier n of the l-th OFDM symbol block and v-th receive antenna is given by $$Y_{n,l}^{(v)} = x_{n,l}^T h_{n,l}^{(v)} + Z_{n,l}^{(v)}; \quad \begin{array}{l} 0 \leq n < N_c \\ 0 \leq l < L \\ 0 \leq v < N_R \end{array} \quad (1)$$

where $Z_{n,l}^{(v)}$ denotes additive white Gaussian noise (AWGN) with zero mean and variance $N_0$. Inter-symbol interference is avoided by setting $N_{CP} T_{spl} \geq \tau_{max}$, where $\tau_{max}$ denotes the maximum delay of the channel impulse response (CIR). In vector notation the signal observed at receive antenna v of OFDM symbol l can be conveniently expressed as $$y_l^{(v)} = X_l h_l^{(v)} + z_l^{(v)} \in \mathbb{C}^{N_c \times 1}. \quad (2)$$

The 2D transmitted signal matrix of dimension $N_c \times N_T N_c$ is composed of transmit symbols in frequency and space, denoted by $X_l = \text{diag}[x_{1,l}^T, \ldots, x_{N_c,l}^T]$. Likewise, the 2D matrix of dimension $N_T N_c \times 1$ describing the CTF is given by $h_l = [h_{1,l}^T, \ldots, h_{N_c,l}^T]^T$. Finally, the $N_c \times 1$ dimension noise vector is composed of $z_l = [z_{1,l}, \ldots, z_{N_c,l}]^T$.

The received signal of one frame is composed of L OFDM symbols, $y^{(v)} = [y_1^T, \ldots, y_L^T]^T$, which is in the form $$y^{(v)} = X h^{(v)} + z^{(v)} \in \mathbb{C}^{N_c L \times 1} \quad (3)$$

with $X = \text{diag}[X_1, \ldots, X_L]$, $h = [h_1^T, \ldots, h_L^T]^T$ and $z = [z_1^T, \ldots, z_L^T]^T$.

The channel transfer function (CTF=Channel Transfer Function) is correlated in time, frequency and space. The discrete CTF $H_{n,l}^{(\mu,v)}$ that propagates from transmit antenna $\mu$ to receive antenna v is obtained by sampling $H^{(\mu,v)}(f,t)$ at frequency $f = n/T$ and time $t = l T_{sym}$, where $T_{sym} = (N_c + N_{CP}) T_{spl}$ and $T = N_c T_{spl}$ represents the OFDM symbol duration with and without the cyclic prefix, and $T_{spl}$ is the sample duration.

The compound CTF from the transmit antenna array to receive antenna v is cast in the channel vector $h_{n,l}^{(v)} = [H_{n,l}^{(1,v)}, \ldots, H_{n,l}^{(N_T,v)}]^T$ in (1). A normalized average channel gain of $E\{\|h_{n,l}^{(v)}\|^2\} = \bar{\sigma}_h^2 = 1$ is assumed. In order to mathematically model the MIMO-OFDM system the following three assumptions are applied, to which embodiments are not limited to. First, a frequency selective time-variant channel is considered, modeled by a tapped delay line with $Q_0$ non-zero taps. Each channel tap q, $1 \leq q \leq Q_0$, with associated tap delay $\tau_q$, is comprised of $S_q$ local scatterers, with Doppler frequency $f_{D,q,s}$ for scatterer S. Second, a base station antenna array is assumed to be mounted above rooftop. In such an environment angle of departures (AoDs) $\phi_{q,s}$, $1 \leq s \leq S_q$, are contained within a certain angular spread $\theta$, as will be detailed subsequently in FIG. 4, giving rise to spatial correlation between transmit antenna elements. Third, the mobile terminal receiver is surrounded by a large number of local scatterers. Hence, angle of arrivals (AoA) $\theta_{q,s}$, $1 \leq s \leq S_q$, can be considered uniformly distributed around the mobile.

Figure 4:
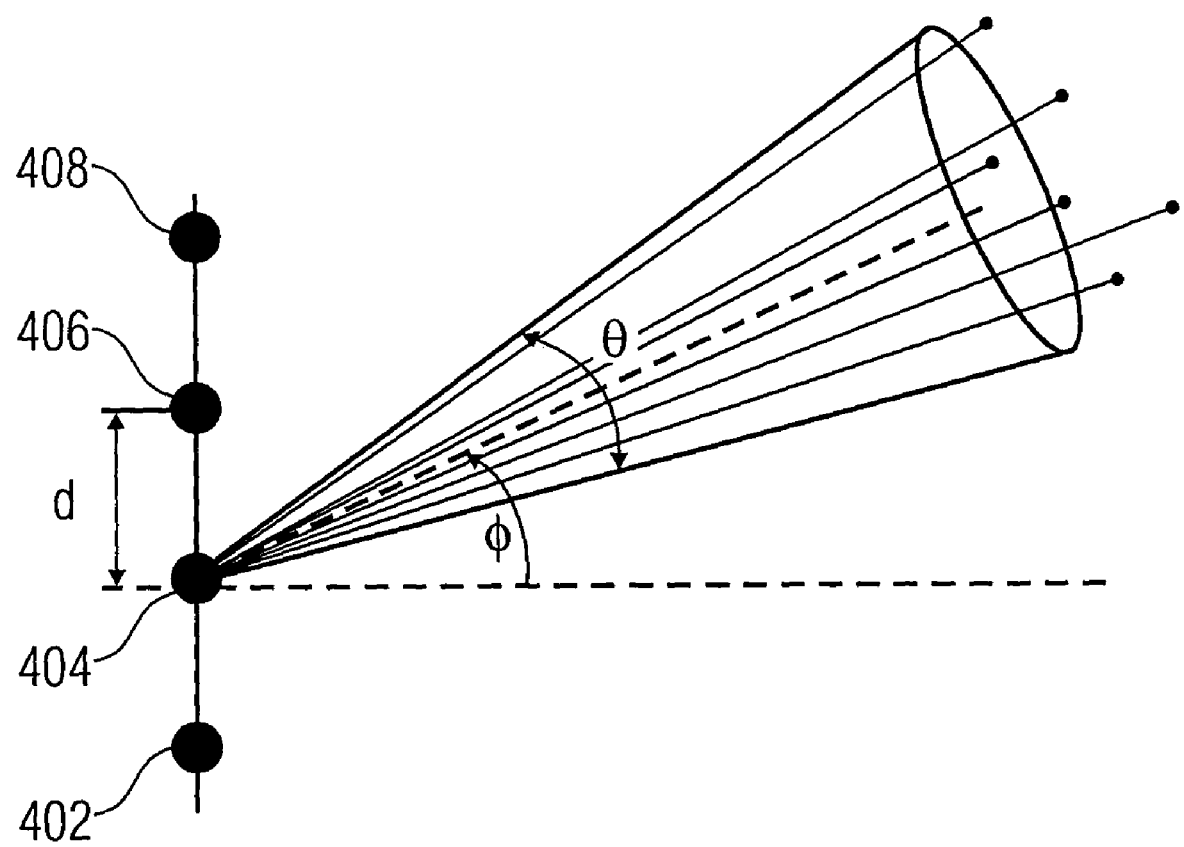
FIG. 4 shows an illustration for the angular spread.

FIG. 4 illustrates the spatial channel model, in particular, the model for the angular spread. FIG. 4 shows a uniform linear antenna array with four antennas 402, 404, 406 and 408. Impinging and departing signals are distributed around a mean angle $\phi$ with an angular spread of $\theta$. With these assumptions the channel vector can be described by $$h_{n,l}^{(v)} = h^{(v)}\left(\frac{n}{T}, l T_{sym}\right) = \sum_{q=1}^{Q_0} A_q \exp\left(-j 2\pi \tau_q \frac{n}{T}\right) \quad (4)$$

$$\sum_{s=1}^{S_q} a(\varphi_{q,s}) \exp(j 2\pi D v \sin \vartheta_{q,s}) \exp(j 2\pi f_{D,q,s} l T_{sym})$$

where $A_q$ is the magnitude of tap q and $$D = \frac{d}{\lambda}$$

represents the antenna spacing normalized by the carrier wavelength λ. In (4) the tap delays $\tau_q$ caused by multi-path propagation impose variations over frequency (sub carrier index n), while time variations due to mobile velocities caused by the Doppler effect lead to variations over time (OFDM symbol index l).

One channel tap is composed of $S_q$ local scatterers, which depart from the transmit antenna array with angle $\phi_{q,s}$.

The spatial properties of the channel vector $h_{n,l}^{(\nu)}$ are determined by the array response $a(\phi_{q,s})$. The array response for a uniform linear array (ULA) with antenna spacing d, for antenna element μ is in the form $$a^{(\mu)}(\varphi) = \exp(j2\pi D\mu\sin\varphi); \quad (5)$$
$$0 \le \mu < N_T$$
$$D = \frac{d}{\lambda}.$$

It is assumed that all $N_R$ receive antennas are mutually uncorrelated. For the purpose of channel estimation, the channel response of receive antenna V is generated independent on the other receive antennas. Hence, the receive antenna V is dropped in the following. With this convention, the CTF at sub carrier n, OFDM symbol l originating from transmit antenna μ is in the form of $$H_{n,l}^{(\mu)} = \sum_{q=1}^{Q_0} A_q \exp\left(-j2\pi\tau_q \frac{n}{T}\right) \sum_{s=1}^{S_q} a^{(\mu)}(\varphi_{q,s}) \exp(j2\pi f_{D,q,s} l T_{sym}) \quad (6)$$
$$= \sum_{q=1}^{Q_0} g_{n,l}^{(\mu)}[q],$$

where $g_{n,l}^{(\mu)}[q]$ accounts for the part of the CTF composed by tap q, and the array response $a^{(\mu)}(\bullet)$ is defined in (5). In case of correlated receive antennas, channel estimates may be enhanced, cf. H. Miao and M. J. Juntti, Space-Time Channel Estimation and Performance Analysis for Wireless MIMO-OFDM Systems With Spatial Correlation, IEEE Trans. Vehic. Technol., vol. 54, pp. 2003-2016, November 2005, J. Wang and K. Araki, Pilot Symbol Aided MAP-Based 3D Channel for Multi-User MIMO-OFDM Systems, IEICE Trans. Commun., vol. E89-B, pp. 801-808, March 2006, and J.-W. Choi and Y.-H. Lee, Complexity-Reduced Channel Estimation in Spatially Correlated MIMO-OFDM Systems, IEICE Trans. Commun., vol. E90-B, pp. 2609-2612, September 2007.

By using the framework of for example J.-W. Choi and Y.-H. Lee the considered estimator can be generalized to correlated receive antennas in a straightforward way. The 2nd-order statistics are determined by the three dimensional (3D) correlation function $$R[\Delta_\mu, \Delta_n, \Delta_l] = E\{H_{n,l}^{(\mu)}(H_{n+\Delta_n,l+\Delta_l}^{(\mu+\Delta_\mu)})^*\} \quad (7)$$
$$= R_t[\Delta_l] \sum_{q=1}^{Q_0} R_{f,q}[\Delta_n] \cdot R_{s,q}[\Delta_\mu]$$

composed of three independent correlation functions in time, frequency and space. The correlation functions in time and frequency are given by W. C. Jakes, Microwave Mobile Communications, Wiley, N.Y., 1974, as $$R_t[\Delta_l] = E\{H_{n,l}^{(\mu)}(H_{n,l+\Delta_l}^{(\mu)})^*\} \quad (8)$$
$$= J_0(2\pi f_{D,max} T_{sym})$$

where $f_{D,max}$ is the maximum Doppler frequency and $J_0(\bullet)$ represents the zero order Bessel function of the first kind, and $$R_{f,q}[\Delta_n] = E\{g_{n,l}^{(\mu)}[q](g_{n+\Delta_n,l}^{(\mu)}[q])^*\} \quad (9)$$
$$= \sigma_q^2 \exp\left(-j2\pi\tau_q \frac{\Delta_n}{T}\right),$$

where $\sigma_q^2 = E[|A_q|^2]$. The spatial correlation between the antennas μ and $\mu+\Delta_\mu$ is in the form $$R_{s,q}[\Delta_\mu] = E\{g_{n,l}^{(\mu)}[q](g_{n,l}^{(\mu+\Delta_\mu)}[q])^*\} \quad (10)$$
$$= \int_{-\pi/2}^{\pi/2} \exp(-j2\pi D\Delta_\mu \sin\varphi)\rho_q(\varphi) d\varphi;$$
$$D = \frac{d}{\lambda},$$

where $\rho_q(\phi)$ denotes the pdf (pdf=probability density function) of the AoD angle distribution associated to tap delay $\tau_q$.

Due to the assumptions that mobiles are surrounded by a large number of local scatterers, $R_t[\Delta_l]$, is independent of the channel tap q. On the other hand, measurements campaigns, cf. IST-4-027756 WINNER II, D1.1.2 WINNER II Channel Models, September 2007, suggest that the spatial correlation $R_{s,q}[\Delta_\mu]$ is closely related to the channel tap q. This is physically motivated by the fact that the large distance separation of dominant reflectors lead to distinct tap delays $\tau_q$. Hence, the 3D correlation function in (7) can only be separated into the time correlation $R_t[\Delta_l]$ and the joint frequency-spatial correlation $R_{fs}[\Delta_n, \Delta_\mu]$:

$$R[\Delta_\mu, \Delta_n, \Delta_l] = R_t[\Delta_l] R_{fs}[\Delta_\mu, \Delta_n] \quad (11)$$

with $$R_{fs}[\Delta_\mu, \Delta_n] = E\{H_{n,l}^{(\mu)}(H_{n+\Delta_n,l}^{(\mu+\Delta_\mu)})^*\} \quad (12)$$
$$= \sum_{q=1}^{Q_0} R_{f,q}[\Delta_n] \cdot R_{s,q}[\Delta_\mu].$$

It is generally accepted that both $R_f^{(\mu\nu)}[\Delta_n]$ and $R_t^{(\mu\nu)}[\Delta_l]$ are strictly band-limited, cf. F. Sanzi and J. Speidel, An Adaptive Two-Dimensional Channel Estimator for Wireless OFDM with Application to Mobile DVB-T, IEEE Trans. Broadcasting, vol. 46, pp. 128-133, June 2000. That is, the inverse Fourier transform of $R_f^{(\mu\nu)}[\Delta_n]$ described by the power delay profile is essentially non-zero in the range $[0, \tau_{max}]$, where $\tau_{max}$ is the maximum channel delay. Likewise, the Fourier transform of $R_t^{(\mu,\nu)}[\Delta_l]$ describing time variations due to mobile velocities is given by the Doppler power spectrum, non-zero within $[-f_{D,max}, f_{D,max}]$. Similar characteristics are observed for the spatial correlation of antenna array mounted above rooftop, the local scatterers associated to tap delay $\tau_q$ are clustered around a mean AoD $\Phi_q$ with an angular spread of $\theta_q$, as illustrated in FIG. 4.

Following J. Salz and J. Winters, Effect of fading correlation on adaptive arrays in digital mobile radio, IEEE Trans.

Vehic. Technol., vol. 43, pp. 1049-1057, November 1994 the integrals in (10) and (12) can be solved by assuming a large number $S_q$ of uniformly distributed local scatterers within the range $$\left[\phi_q - \frac{\theta_q}{2}, \phi_q + \frac{\theta_q}{2}\right].$$

Then the pdf $\rho_q(\phi)$ can be approximated by the continuous pdf $$\rho_q(\varphi) = \begin{cases} \frac{1}{\theta_q} & -\frac{\pi}{2} \le \phi_q - \frac{\theta_q}{2} \le \varphi \le \phi_q + \frac{\theta_q}{2} \le \frac{\pi}{2} \\ 0 & \text{elsewhere} \end{cases} \quad (13)$$

The general correlation function $R_{s,q}$ is given in equations (A-19) and (A-20) of J. Salz and J. Winters, Effect of fading correlation on adaptive arrays in digital mobile radio, IEEE Trans. Vehic. Technol., vol. 43, pp. 1049-1057, November 1994.

Small angular spreads may be approximated according to the following assumptions. As the angular spread $\theta_q$ is typically small, the correlation $R_{s,q}$ can be approximated by a simplified expression as described in the following. Define $\tilde{\varphi} = \varphi - \Phi_q$ uniformly distributed in the range $$\tilde{\varphi} \in \left[-\frac{\theta_q}{2}, \frac{\theta_q}{2}\right].$$

Invoking the trigonometrical addition theorem for small angular spreads $$\left(\theta_q < \frac{\pi}{6}\right)$$

with $\sin \tilde{\varphi} \approx \tilde{\varphi}$ and $\cos \tilde{\varphi} \approx 1$, yields $$\sin\varphi = \sin(\tilde{\varphi} + \phi_q)$$
$$= \sin\tilde{\varphi} \cdot \cos\phi_q + \cos\tilde{\varphi} \cdot \sin\phi_q \approx \tilde{\varphi} \cdot \cos\phi_q +$$
$$\sin\phi_q \text{ for } \tilde{\varphi} \square \frac{\pi}{2}.$$

Then the array response (5) can be approximated as $$\alpha^{(\mu)}(\tilde{\varphi}) \approx \exp(j2\pi D\mu(\tilde{\varphi} \cos \Phi_q + \sin \Phi_q)) \quad (14)$$

and correlation between transmit antennas $\mu$ and $\mu+\Delta_\mu$ becomes $$R_{s,q}[\Delta_\mu] \approx \exp(j2\pi\Delta_\mu D\sin\phi_q) \cdot \frac{\sin(\pi\theta_q\Delta_\mu D\cos\phi_q)}{\pi\theta_q\Delta_\mu D\cos\phi_q}; \quad (15)$$

$$D = \frac{d}{\lambda}.$$

Pilot aided channel estimation (PACE) was first introduced for single carrier systems and required a flat-fading channel, cf. J. K. Cavers, An Analysis of Pilot Symbol Assisted Modulation for Rayleigh Fading Channels, IEEE Trans. Vehic. Technol., vol. VT-40, pp. 686-693, November 1991.

For conventional 2D PACE, $N_p$ known reference symbols (pilots) are inserted with equidistant pilot spacing $D_t$ in time and $D_f$ in frequency, cf. P. Höher, S. Kaiser, and P. Robertson, Pilot-Symbol-Aided Channel Estimation in Time and Frequency, in Proc. Communication Theory Mini-Conf. (CTMC) within IEEE Global Telecommun. Conf. (Globecom '97), Phoenix, USA, pp. 90-96, 1997. In previous work on MIMO-OFDM channel estimation spatial correlation is exploited so to improve the accuracy of the channel estimates, cf.

M. Stege, P. Zillmann, and G. Fettweis, MIMO Channel Estimation with Dimension Reduction, in Proc. Int. Symp. Wireless Pers. Multimedia Commun. (WPMC 2002), Hawaii, USA, October 2002, H. Miao and M. J. Juntti, Space-Time Channel Estimation and Performance Analysis for Wireless MIMO-OFDM Systems With Spatial Correlation, IEEE Trans. Vehic. Technol., vol. 54, pp. 2003-2016, November 2005, J. Wang and K. Araki, Pilot Symbol Aided MAP-Based 3D Channel for Multi-User MIMO-OFDM Systems, IEICE Trans. Commun., vol. E89-B, pp. 801-808, March 2006, and J.-W. Choi and Y.-H. Lee, Complexity-Reduced Channel Estimation in Spatially Correlated MIMO-OFDM Systems, IEICE Trans. Commun., vol. E90-B, pp. 2609-2612, September 2007. However, embodimenst utilizing interpolation in space provide significant benefits and advantages compared to these concepts, as pilot overhead can be reduced while upkeeping the channel estimation quality.

For the proposed three-dimensional (3D) PACE spatial correlation is exploited to reduce the pilot overhead. By allowing for a pilot spacing in space $D_s$, pilots are not inserted for each transmit antenna $\mu$; rather the channel response is obtained by interpolation between pilots of different transmit antennas, as illustrated in FIG. 2. While the discussion of the above embodiments was with respect to OFDM, 3D PACE can be readily extended to generalized multi-carrier waveforms Z. Wang and G. B. Giannakis, Wireless Multicarrier Communications—Where Fourier Meets Shannon, IEEE Signal Proc. Mag., vol. 17, pp. 29-48, May 2000], which includes DFT spread OFDM, multi-carrier (MC) CDMA and zero padding (ZP) OFDM, by applying the framework of C.-T. Lam, G. Auer, F. Danilo-Lemoine, and D. Falconer, Design of Time and Frequency Domain Pilots for Generalized Multicarrier Systems, in Proc. IEEE Int. Conf. Commun. (ICC 2007), Glasgow, UK, June 2007.

A regular 3D grid can be found in Y. Li, Pilot-Symbol-Aided Channel Estimation for OFDM in Wireless Systems, IEEE Trans. Vehic. Technol., vol. 49, pp. 1207-1215, July 2000.

$$\begin{bmatrix} \mu \\ n \\ l \end{bmatrix} = G\tilde{d} + d_0; \quad (16)$$

$$G = \begin{bmatrix} D_s & \delta_{sf} & 0 \\ d_{sf} & D_f & 0 \\ d_{st} & 0 & D_t \end{bmatrix},$$

$$d_0 = \begin{bmatrix} \mu_0 \\ n_0 \\ l_0 \end{bmatrix}$$

where $\tilde{d} = [\tilde{\mu}, \tilde{n}, \tilde{l}]^T$ is the pilot index, variables describing pilot symbols will be marked with a "˜" in the following. Furthermore, $d_0=[\mu_0,n_0,l_0]^T$ accounts for the shift of the first pilot with respect to $[0,0,0]^T$. The transmitted signal sequence containing only pilots is denoted by, $\{\tilde{X}_{\bar{n},\bar{l}}^{(\bar{\mu})}\}=\{X_{n,l}^{(\mu)}\}$, with $\mu$, n and l given by (16). In general, non-zero off-diagonal elements of G assemble a non-rectangular pilot grid, e.g. a diamond shaped grid, cf. J. Choi and Y. Lee, Optimum Pilot Pattern for Channel Estimation in OFDM Systems, IEEE Trans. Wireless Commun., vol. 4, pp. 2083-2088, September 2005, or the DVB-T grid, cf. F. Sanzi and J. Speidel, An Adaptive Two-Dimensional Channel Estimator for Wireless OFDM with Application to Mobile DVB-T, IEEE Trans. Broadcasting, vol. 46, pp. 128-133, June 2000. In (16) the parameter $\delta_{sf}$ shifts pilots along the spatial domain.

Figure 5:
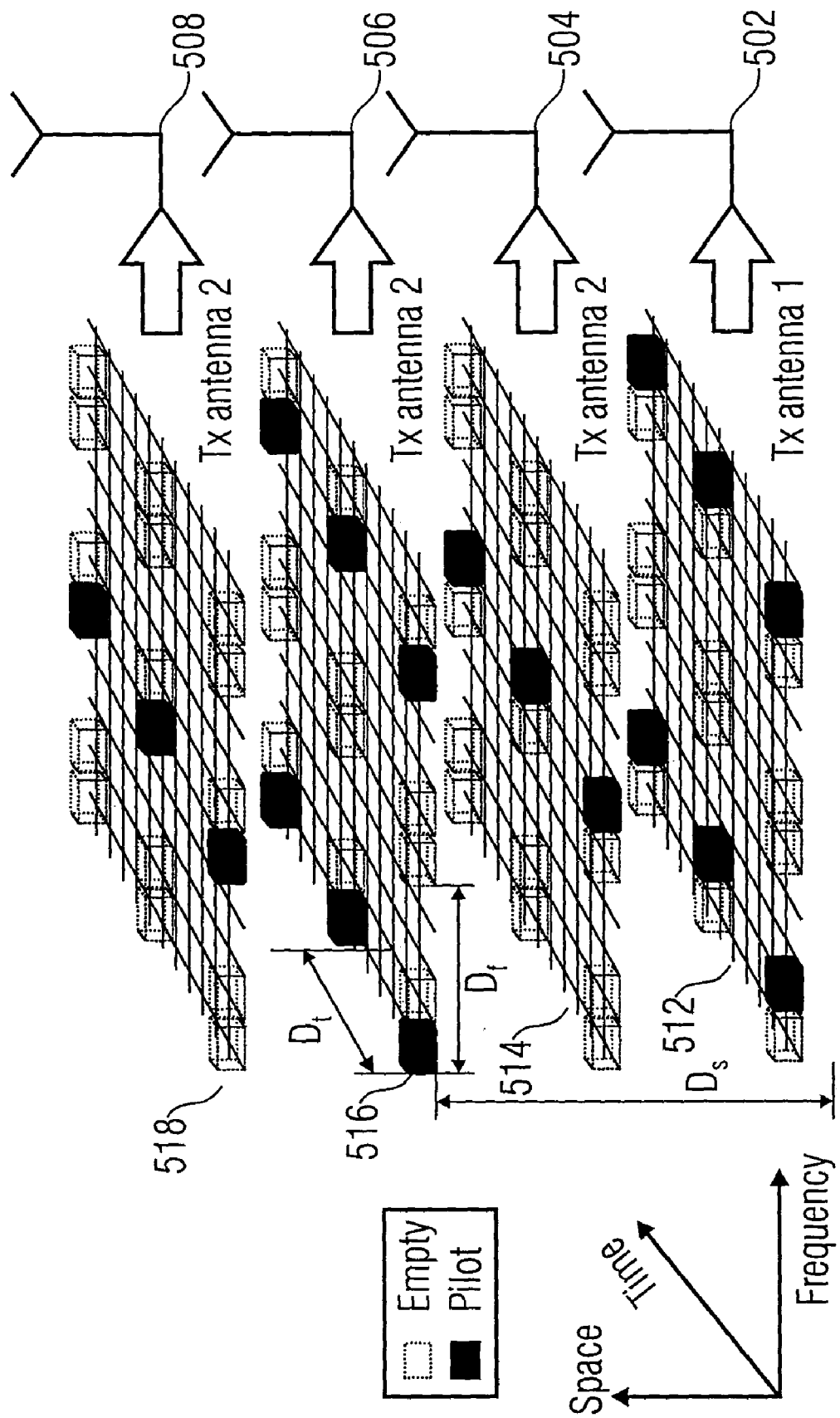
FIG. 5 illustrates a diamond-shaped space-frequency grid according to an embodiment.

FIG. 5 illustrates an embodiment of a diamond-shaped space-frequency or space-time grid. The embodiment shown in FIG. 5 utilizes four transmit antennas 502, 504, 506 and 508. Moreover, FIG. 5 illustrates four layers of time-frequency dimensioned pilot schemes 512, 514, 516 and 518. The illustration used in FIG. 5 is similar to the illustrations described above for FIGS. 2 and 9. Accordingly, dark cubes represent pilot or reference symbols, empty cubes represent empty transmission resources. FIG. 5 illustrates that the frequency spacing $D_f=4$, the time spacing $D_t=5$ and the spatial spacing $D_s=2$.

Furthermore, the off-diagonal element is set to $\delta_{sf}=1$, resulting in a diamond shaped space-frequency grid. In order to obtain channel estimates from all $N_T$ transmit antennas pilots belonging to different transmit antennas are orthogonally separated in time, frequency and/or space, as shown in FIG. 2. One way to achieve this is by imposing the condition of either $d_{sf} \mod D_f \neq 0$ or $d_{st} \mod D_t \neq 0$ in (16). In FIG. 5 pilots from different antenna elements are separated in frequency by setting $d_{sf}=1$ and $d_{st}=0$. This provides a subsampled version of the 3D CTF h in (3) corrupted by noise, which avoids interference between pilots belonging to different transmit antennas. Note, there are other possibilities to orthogonally separate the pilots, but they lead to higher complexity and/or at least the same pilot overhead, cf. G. Auer, Analysis of Pilot-Symbol Aided Channel Estimation for OFDM Systems with Multiple Transmit Antennas, in Proc. IEEE Int. Conf. Commun. (ICC 2004), Paris, France, pp. 3221-3225, June 2004.

Nevertheless, the embodiment of 3D PACE can also be generalized to other schemes, such as phase shifted pilot sequences, cf. I. Barhumi, G. Leus, and M. Moonen, Optimal training design for MIMO OFDM systems in mobile wireless channels, Signal Processing, IEEE Transactions on, vol. 51, pp. 1615-1624, June 2003, by extending concepts disclosed in W. G. Jeon, J. H. Paik, and Y. S. Cho, Two Dimensional MMSE (MMSE=Minimum Mean Square Error) Channel Estimation for OFDM Systems with Transmitter Diversity, in Proc. IEEE Vehic. Technol. Conf. 2001-Fall (VTC'F01), Atlantic City, USA, October 2001, G. Auer, Channel Estimation for OFDM Systems with Multiple Transmit Antennas by Filtering in Time and Frequency, in Proc. IEEE Vehic. Technol. Conf. 2003-Fall (VTC'F03), Orlando, USA, Oct. 2003 from two to three dimensions.

In total $N_P$ pilots are inserted which are distributed in time, frequency and space according to $$N_P = N_{P,t} \cdot N_{P,f} \cdot N_{P,s} = \left\lceil \frac{L}{D_t} \right\rceil \cdot \left\lceil \frac{N_c}{D_f} \right\rceil \cdot \left\lceil \frac{N_T}{D_s} \right\rceil. \quad (17)$$

The received pilot sequence $\tilde{y}=\tilde{h}+\tilde{z}$ of dimension $N_P \times 1$ is a subsampled version of the 3D CTF h in (3). Not all pilots may be utilized for channel estimation. A subset of pilots in time, $M_t \leq N_{P,t}$, frequency, $M_f \leq N_{P,f}$ and space, $M_s \leq N_{P,s}$, may be used for channel estimation in some embodiments. The estimate of h denoted by $\hat{h}$ can be obtained by means of minimum mean squared error (MMSE) based 3D interpolation.

In one embodiment, supposing the transmitted signal includes beamforming, $x_{n,l}=s_{n,l}b_{n,l}$, where $b_{n,l}$ denotes the beamforming vector, and $s_{n,l}$ accounts the transmitted symbol. Then the receiver needs to estimate the effective channel, i.e. the channel response including user specific beamforming, $H_{eff}=b_{n,l}^T h_{n,l}$. If the beamforming vector is known at the receiver, the effective channel is determined by $\hat{H}_{eff}=b_{n,l}^T \hat{h}_{n,l}$, where $\hat{h}_{n,l}$ is the estimate of $h_{n,l}$. This is the case for fixed beamforming, where $b_{n,l}$ is selected from a number of pre-defined vectors. This scenario is applicable e.g. for the 3GPP LTE standard 3GPP TS 36.211 V8.2.0, 3rd Generation Partnership Project; Technical Specification Group Radio Access Network; Evolved Universal Terrestrial Radio Access (E-UTRA); Physical Channels and Modulation (Release 8), tech. rep., March 2008.

In embodiments the means 130 for processing may be adapted for carrying out Wiener filtering. The means 130 for processing can be adapted for processing the estimate $\hat{h}_2$ of the second radio channel based on a three-dimensional Wiener filter based on a three-dimensional cross-correlation in time, frequency and space dimensions. In further embodiments the means 130 for processing can be adapted for processing the estimate $\hat{h}_2$ of the second radio channel based on a spatial property of the MIMO radio channel according to three one-dimensional Wiener filters, one Wiener filter being based on a correlation property in the time domain, one Wiener filter being based on a correlation property in the frequency domain and one Wiener filter being based on a correlation property in the spatial domain as the spatial property of the MIMO radio channel.

A Wiener interpolation filter (WIF=Wiener Interpolation Filter) is implemented by an FIR filter, $w[\mu, n, l]$, with $M=M_t M_f M_s$ taps. The CTF estimate for sub carrier n, OFDM symbol l and transmit antenna $\mu$ is given by $$\hat{H}_{n,ell}^\mu = w^H[\mu,n,l]\tilde{y} = r_{H\tilde{y}}^H[\mu, n, l] R_{\tilde{y}\tilde{y}}^{-1} \tilde{y}. \quad (18)$$

The WIF $w[\mu, n, l] = R_{\tilde{y}\tilde{y}}^{-1} r_{H\tilde{y}}[\mu,n,l]$ minimizes the mean squared error between the desired response, $H_{n,ell}^\mu$, and the filtered output, $\hat{H}_{n,ell}^\mu$, given the received pilot sequence $\tilde{y}$.

The 3D auto-correlation matrix of the received pilots, $\tilde{y}$, is composed of $R_{\tilde{y}\tilde{y}} = R_{\tilde{h}\tilde{h}} + N0 I$, where $R_{\tilde{h}\tilde{h}} = E\{\tilde{h}\tilde{h}^H\}$ is the auto-correlation matrix of the CTF at pilot positions excluding the AWGN term, and I denotes the identity matrix, all of dimension M×M. The $i^{th}$ row and $j^{th}$ column of $R_{\tilde{h}\tilde{h}}$ can be expressed as $$\{R_{\tilde{h}\tilde{h}}\}_{i,j} = R[D_s \cdot (\tilde{\mu}_1 - \tilde{\mu}_2), D_f(\tilde{n}_1 - \tilde{n}_2), D_t(\tilde{l}_1 - \tilde{l}_2)];$$

$$i = \tilde{\mu}_1 + M_s \tilde{n}_1 + M_s M_f \tilde{l}_1$$

$$j = \tilde{\mu}_2 + M_s \tilde{n}_2 + M_s M_f \tilde{l}_2 \quad (19)$$

where $R[\cdot]$ denotes the 3D correlation function defined in (7).

The 3D cross-correlation functions $r_{H\tilde{y}}^H[\mu, n, l] = E\{\tilde{y}(H_{n,l}^{(\mu)})^*\}$ represent the cross-correlation between $\tilde{y}$ and the desired response $H_{n,l}^{(\mu)}$. The i-th entry of $r_{H\tilde{y}}^H[\mu, n, l]$ specifies the correlation between the CTF of pilot symbol i and the desired response, $H_{n,ell}^{(\mu)}$, which is in the form $$\{r_{H\tilde{y}}^H[\mu,n,l]\}_i = R[\mu - D_s \tilde{\mu}, n - D_f \tilde{n}, l - D_t \tilde{l}]; i = \tilde{\mu} + M_s \tilde{n} + M_s M_f \tilde{l}. \quad (20)$$

A cascaded channel estimator consisting of three one dimensional (1D) estimators termed 3X1D PACE may be implemented as proposed by J.-W. Choi and Y.-H. Lee, Complexity-Reduced Channel Estimation in Spatially Correlated MIMO-OFDM Systems, IEICE Trans. Commun., vol. E90-B, pp. 2609-2612, September 2007, fort he case wehn pilot symbols are available from all transmit antennas within coherence time and bandwidth. In one embodiment the means 130 may be adapted for separating the 3d interpolation into three one-dimensional interpolations. The separation of the 3D estimator (18) into three 1D estimators requires to separate the 3D correlation function (11) into three 1D components, which is only possible with the approximation $$R[\Delta_\mu, \Delta_n, \Delta_l] \approx R_t[\Delta_l] \cdot \left(\sum_{q=1}^{Q_0} R_{f,q}[\Delta_n]\right) \cdot \left(\sum_{q=1}^{Q_0} R_{s,q}[\Delta_\mu]\right) \quad (21)$$

As an exact separation of the frequency-space correlation (12) is not possible, a certain degradation in performance of 3×1D PACE is to be exptected in embodiments due to the above approximation.

A computationally efficient implementation of 3×1D PACE is via a Wiener interpolation filter (WIF) with model mismatch, i.e. in an embodiment wherein the means 130 for processing is adapted for processing according to a Wiener filter. According to P. Höher, S. Kaiser, and P. Robertson, Pilot-Symbol-Aided Channel Estimation in Time and Frequency, in Proc. Communication Theory Mini-Conf. (CTMC) within IEEE Global Telecommun. Conf. (Globecom '97), Phoenix, USA, pp. 90-96, 1997, the filter coefficients in frequency and time can be generated assuming a uniformly distributed power delay profile and Doppler power spectrum, non-zero within the range $[0, \tau_w]$ and $[-f_{D,w}, f_{D,w}]$.

Furthermore, the average SNR at the filter input, $\gamma_w$, is required, which should be equal or larger than actual average SNR, so $\gamma_w \geq \gamma_0$.

In the spatial domain, a uniform angle distribution is assumed within the angular spread $\theta_w$ around the mean AoD, $\Phi_w$, that is $$\varphi \in \left[\phi_w - \frac{\theta_w}{2}, \phi_w + \frac{\theta_w}{2}\right].$$

Assuming a large number of local scatterers, the angle distribution can be approximated by the continuous pdf $$\rho(\varphi) = \begin{cases} \frac{1}{\theta_w} & -\frac{\pi}{2} \leq \phi_w - \frac{\theta_w}{2} \leq \varphi \leq \phi_w + \frac{\theta_w}{2} \leq \frac{\pi}{2} \\ 0 & \text{elsewhere.} \end{cases} \quad (22)$$

The angular spread and the mean AoD are determined by $$\theta_w = \varphi_{max} - \varphi_{min} \quad (23)$$
$$\phi_w = \frac{1}{2}(\varphi_{max} + \varphi_{min}),$$

where $\phi_{max} = \max_{q,s} \phi_{q,s}$ and $\phi_{min} = \min_{q,s} \phi_{q,s}$ denote the maximum and minimum AoD.

With J. Salz and J. Winters, Effect of fading correlation on adaptive arrays in digital mobile radio, IEEE Trans. Vehic. Technol., vol. 43, pp. 1049-1057, November 1994, the spatial correlation function (10) between antenna elements µ and $\mu+\Delta_\mu$ yields $$\text{Re}\{R_{aa}[\Delta_\mu]\} = J_0(2\pi D\Delta_\mu) + 2\sum_{k=1}^{\infty} J_{2k}(2\pi D\Delta_\mu)\cos(2k\phi_w)\frac{\sin(k\theta_w)}{k\theta_w} \quad (24)$$

$$\text{Im}\{R_{aa}[\Delta_\mu]\} = 2\sum_{k=0}^{\infty} J_{2k+1}(2\pi D\Delta_\mu)\sin([2k+1]\phi_w)\frac{\sin\left(\left[k+\frac{1}{2}\right]\theta_w\right)}{\left[k+\frac{1}{2}\right]\theta_w} \quad (25)$$

where $$D = \frac{d}{\lambda},$$

and $J_k$ represents an order k Bessel function of the first kind.

To generate the filter coefficients the mean AoD $\Phi_w$ as well as the angular spread $\theta_w$ need to be estimated.

Figure 6:
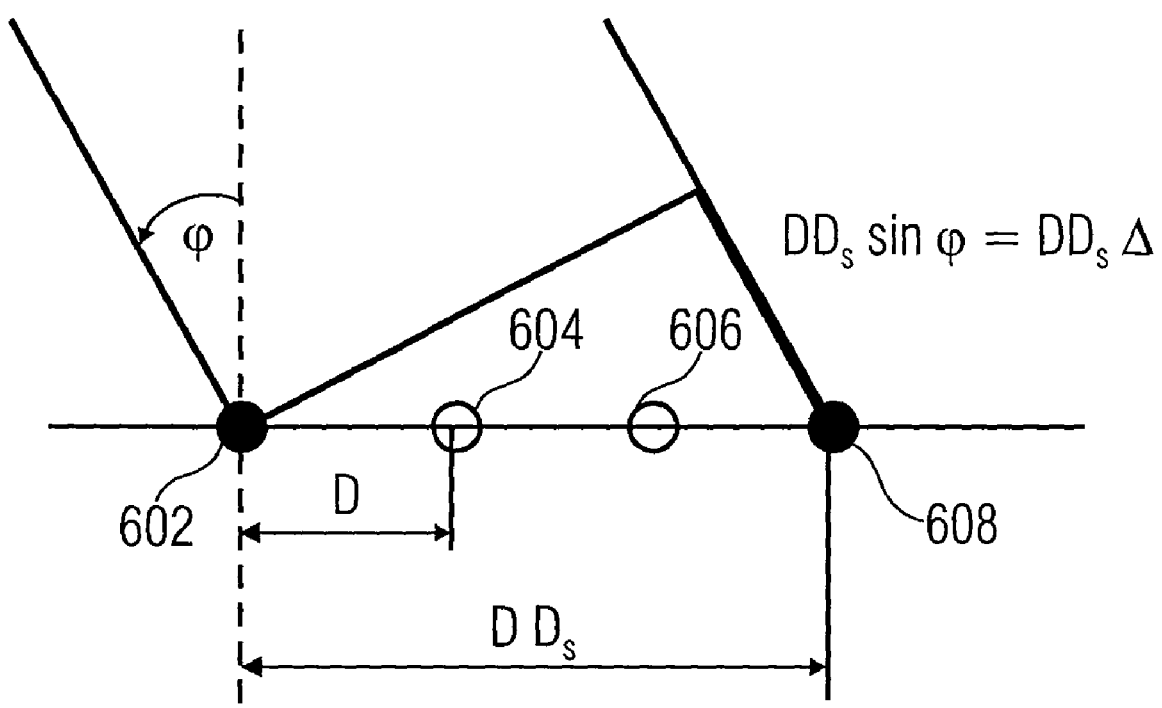
FIG. 6 illustrates a uniform linear antenna array.

FIG. 6 shows an illustration of a uniform linear array with antennas 602, 604, 606 and 608. As indicated in FIG. 6, the antenna elements have a spacing of D. FIG. 6 also indicates that reference symbols impinge from antenna elements 602 and 608, i.e. the spatial spacing $D_s$ equals three in the present case. Moreover, FIG. 6 indicates that the plain waves impinge from an angle of θ.

Figure 7:
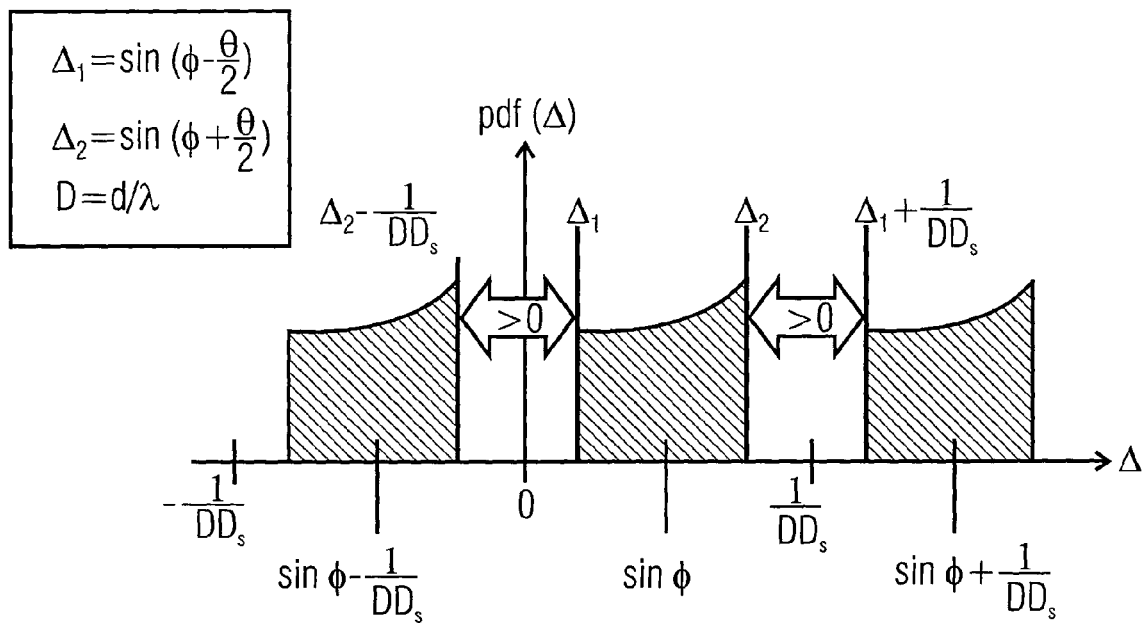
FIG. 7 illustrates an angular distribution when considering local scatterers.

FIG. 7 illustrates a pdf of Δ, i.e. a measure for normalized power distribution in the angular domain or in other words, the angular distribution of local scatterers. In analogy to the sampling theorem in time and frequency, cf. F. Sanzi and J. Speidel, An Adaptive Two-Dimensional Channel Estimator for Wireless OFDM with Application to Mobile DVB-T, IEEE Trans. Broadcasting, vol. 46, pp. 128-133, June 2000, there exists a maximum pilot spacing in space for which the spatial array response (5) can be reconstructed. To ensure this, each AoD) φ, must have an unique subsampled array responses are considered, as depicted in FIG. 6, $$\tilde{a}^{(\tilde{\mu})}(\varphi) = \exp(j2\pi DD_s\tilde{\mu}\sin\varphi), 0 \leq \tilde{\mu} < \left\lceil\frac{N_T}{D_s}\right\rceil, \quad (26)$$

where the ceiling operator $\lceil x \rceil$ denotes the smallest integer that is equal or smaller than x. Assuming that the AoDs are distributed according to (23), the distribution of the equivalent length Δ=sin φ can be described by the pdf $$\rho(\Delta) = \rho(\sin\varphi) \quad (27)$$

$$= \begin{cases} \frac{1}{\theta_w\sqrt{1-\Delta^2}} & \sin\left(\phi_w - \frac{\theta_w}{2}\right) \leq \Delta \leq \sin\left(\phi_w + \frac{\theta_w}{2}\right) \\ 0 & \text{elsewhere.} \end{cases}$$

Since Δ=sin φ is periodic with 2π spatial aliases are observed spaced $1/(DD_s)$ apart, as illustrated in FIG. 7. The array response $\alpha^{(\tilde{u})}(\phi)$ in (5) can be perfectly reconstructed given $\tilde{\alpha}^{(\tilde{u})}(\phi)$ in (26), if the angle distribution $\rho(\sin\phi)$ does not overlap with its aliases. From FIG. 7 conditions for separation can be extracted:

$$\sin\left(\phi_w + \frac{\theta_w}{2}\right) < \sin\left(\phi_w - \frac{\theta_w}{2}\right) + \frac{1}{DD_s},$$

with $$D = \frac{d}{\lambda}.$$

Utilizing the trigonometric addition theorem this translates to the following condition for the pilot spacing in space $$D_s < \frac{1}{2D\cos\phi_w \cdot \sin\frac{\theta_w}{2}}. \quad (28)$$

Regarding the maximum allowable pilot spacing, the worst case condition is for $\cos\Phi_w = 0$, which yields $$D_s < \frac{1}{2D\sin\frac{\theta_w}{2}} \approx \frac{1}{D\theta_w}, \quad (29)$$

where the latter approximation applies to small angular spreads $\theta_w \leq \pi/6$.

For an antenna spacing $$d = \frac{\lambda}{2}$$

which corresponds to $$D = \frac{1}{2}$$

the following is obtained $$D_s < \frac{1}{\sin\frac{\theta_w}{2}} \approx \frac{2}{\theta_w}. \quad (30)$$

The MSE of an arbitrary estimator $w$ of dimension $1 \times M$ can be expressed in the general form $$E[|H_{n,l}^{(\mu)} - \hat{H}_{n,l}^{(\mu)}|^2] = E[|H_{n,l}^{(\mu)}|^2] - 2$$
$$Re\{w^H r_{H\bar{Y}}[\mu, n, l]\} + w^H R_{\bar{Y}\bar{Y}} w \quad (31)$$

with $\hat{H}_{n,l}^{(\mu)} = w^H \tilde{y}$. The $M_f$ dimension vector $\tilde{Y}$ accounts for the received pilot sequence of one OFDM symbol, and is used to determine $R_{\bar{Y}\bar{Y}}$ and $R_{H\bar{Y}}^{(\mu)}(i)$. Note, that (31) is valid for any estimator $w$ with or without model mismatch. Furthermore, an estimator with reduced length, $M_f$, can be applied to (31) by inserting zeros in the appropriate positions in embodiments of the means 130.

An MIMO-OFDM system with $N_T = 4$ transmit antennas is considered based on the WINNER specifications IST-4-027756 WINNER II, D6.13.14 WINNER II System Concept Description, December 2007. One frame consists of L=12 OFDM symbols and each OFDM symbol is composed of $N_c = 1024$ sub carriers. A cyclic prefix of duration $T_{CP} = 128 \cdot T_{spl}$ is employed. The signal bandwidth is 40 MHz, which translates to a sampling duration of $T_{spl} = 25$ ns. This results in an OFDM symbol duration of $T_{sym} = 35.97$ μs of which the cyclic prefix is $T_{CP} = 3.2$ μs. An urban mobility scenario is considered with velocities up to 50 km/h. At 5 GHz carrier frequency this translates to a normalized maximum Doppler frequency of $f_{D,max} T_{sym} \leq 0.0067$. The typical urban channel model specified by the WINNER project is considered having an angular spread of 35°, cf. IST-4-027756 WINNER II, D1.1.2 WINNER II Channel Models, September 2007.

For the pilot spacings in time, frequency and space $D_t = 8$, $D_f = 6$ and $D_s = 2$ are chosen. Furthermore, $l_0 = 1$, $n_0 = 1$ and $s_0 = 0$. Orthogonality between pilots of different transmit antennas is maintained by setting $d_{sf} = 1$ and $d_{st} = 0$ in (16). Finally, to reduce edge effects, a diamond shaped space-frequency grid with $\delta_{sf} = 1$ is used in an embodiment, as depicted in FIG. 5.

The channel estimation unit is implemented by a WIF with $M_t = 2$, $M_f = 16$ and $M_s = 2$ filter coefficients in time, frequency and space. To generate the filter coefficients, knowledge of the second order statistics in the form of the auto- and cross-correlation matrices in (19) and (20) is assumed to be available.

Figure 8:
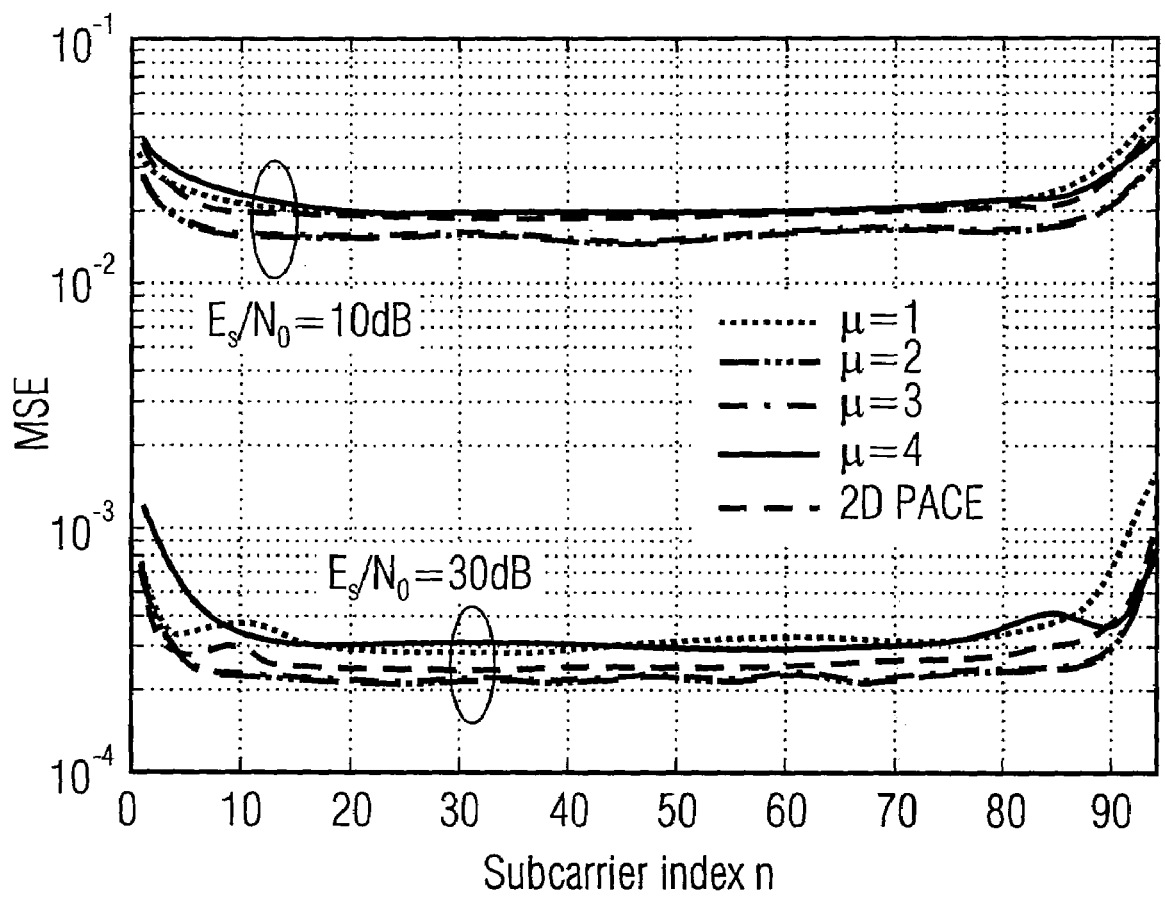
FIG. 8 illustrates simulation results.

FIG. 8 illustrates simulation results for the mean square error versus the sub carrier index n for a three-dimensional PACE with $N_T = 4$ transmit antennas and pilot spacing in space of $D_s = 2$. The MSE for two-dimensional PACE, which does not attempt to exploit the spatial correlation, is shown for comparison. The results obtained with the embodiment are shown at two $E_s/N_0$ of 10 dB and 30 dB, which is symbol energy $E_s$ over noise density $N_0$, for the channel estimates of four sub channels $\mu = 1..4$ of the MIMO radio channel.

The MSE is plotted over the sub carrier index n for 3D PACE in FIG. 8. The MSE for all transmit antennas' signals is estimated accurately by the proposed estimator. For comparison the MSE for conventional 2D PACE that does not attempt to exploit spatial correlation is also plotted. It is seen that the performance of 3D PACE is close to 2D PACE, while the required pilot overhead for 3D PACE is reduced by a factor of two, which demonstrates the advantage of embodiments saving half of the transmission resources for pilot symbols in the present scenario.

Depending on certain implementation requirements of the inventive methods, the inventive methods can be implemented in hardware or in software. The implementation can be performed using a digital storage medium, in particular, a flash memory, a disc, a DVD or a CD having an electronically-readable control signal stored thereon, which co-operates with a programmable computer system, such that the inventive methods are performed. Generally, the present invention is, therefore, a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer or processor.

The invention claimed is:

1. A radio channel estimator for estimating a first radio channel to obtain a first radio channel estimate, the first radio channel being comprised in a multiple input multiple output (MIMO=multiple input multiple output) radio channel, the MIMO radio channel extending between at least a first transmit antenna, a second transmit antenna and a receive antenna, the first radio channel extending between the first transmit antenna and the receive antenna, comprising:
- a receiver for receiving a reference symbol transmitted by the second transmit antenna;
- an estimator for estimating a second radio channel based on the reference symbol, the second radio channel extending between the second transmit antenna and the receive antenna; and
- a processor for processing the estimate of the second radio channel based on a spatial property of the MIMO radio channel to obtain the first radio channel estimate, wherein
- the MIMO radio channel has a coherence time, a coherence bandwidth and a coherence length, a spacing between the first transmit antenna and the second transmit antenna being less than the coherence length, and
- no reference symbol is provided by the first transmit antenna within the coherence time or the coherence bandwidth.

2. The radio channel estimator of claim 1, wherein the receiver is adapted for receiving a further reference symbol from a third transmit antenna, and wherein the estimator is adapted for estimating a third radio channel based on the further reference symbol, the third radio channel extending between the third transmit antenna and the receive antenna, and wherein the processor is adapted for processing the estimate of the second radio channel and the estimate of the third radio channel based on the spatial property of the MIMO radio channel to obtain the first radio channel estimate.

3. The radio channel estimator of claim 2, wherein the processor is adapted for interpolating between the estimate of the second radio channel and the estimate of the third radio channel to obtain the first radio channel estimate, wherein the spatial property comprises a correlation property of the first and second radio channels.

4. The radio channel estimator of claim 1, wherein the receiver is adapted for receiving the reference symbol on a first sub carrier having a first sub carrier frequency, and wherein the processor is adapted for processing the estimate based on the spatial property of the MIMO radio channel to obtain the first radio channel estimate for a second sub carrier, the second sub carrier having a different frequency than the first sub carrier.

5. The radio channel estimator of one of claim 1, wherein the receiver is adapted for receiving reference symbols on a multiplicity of sub carriers, the sub carriers having different sub carrier frequencies, and wherein the estimator is adapted for estimating radio channels on the multiplicity of sub carriers and wherein the processor is adapted for processing the estimates of the different sub carriers based on the spatial property of the MIMO radio channel to obtain the first radio channel estimate for a sub carrier on which no reference symbol is provided.

6. The radio channel estimator of claim 1, wherein the receiver is adapted for receiving the reference symbol in a first time slot, and wherein the estimator is adapted for estimating the second radio channel based on the reference symbol in the first time slot, and wherein the processor is adapted for processing the estimate of the second radio channel based on the spatial property of the MIMO radio channel to obtain the first radio channel estimate for a second time slot, the second time slot being different from the first time slot.

7. The radio channel estimator of claim 1, wherein the receiver is adapted for receiving reference symbols in a multiplicity of time slots, and wherein the estimator is adapted for estimating radio channels based on the multiplicity of reference symbols received in the multiplicity of time slots, and wherein the processor is adapted for processing the estimates of the multiplicity of radio channels based on the spatial property of the MIMO radio channel to obtain the first radio channel estimate for a time slot for which no reference symbol was provided.

8. The radio channel estimator of claim 1, wherein the processor is adapted for processing the estimate of the second radio channel based on a three-dimensional Wiener filter based on a three-dimensional cross-correlation in time, frequency and space dimensions.

9. The radio channel estimator of claim 1, wherein the processor is adapted for processing the estimate of the second radio channel based on a spatial property of the MIMO radio channel according to three one-dimensional Wiener filters, one Wiener filter being based on a correlation property in the time domain, one Wiener filter being based on a correlation property in the frequency domain and one Wiener filter being based on a correlation property in the spatial domain as the spatial property of the MIMO radio channel.

10. The radio channel estimator of claim 1, wherein the receiver is adapted for receiving reference symbols in equidistant time slots, equidistant sub carriers and/or for equidistant transmit antennas.

11. The radio channel estimator of claim 1, wherein the receiver is adapted for receiving reference symbols with irregular time spacing, irregular frequency spacing and/or irregular spatial separation.

12. The radio channel estimator of claim 1, wherein the processor is adapted for processing estimates of a multiplicity of radio channels based on the spatial property of the MIMO radio channel to obtain the first radio channel estimate for a time slot for which no reference symbol was provided.

13. Method for estimating a first radio channel to obtain a first radio channel estimate, the first radio channel being comprised in a MIMO radio channel (MIMO=Multiple Input Multiple Output) extending between at least a first transmit antenna, a second transmit antenna and a receive antenna, the first radio channel extending between the first transmit antenna and the receive antenna, comprising:
- receiving a reference symbol transmitted by the second transmit antenna;
- estimating a second radio channel based on the reference symbol, the second radio channel extending between the second transmit antenna and the receive antenna; and
- processing the estimate of the second radio channel based on a spatial property of the MIMO radio channel to obtain the first radio channel estimate, wherein
- the MIMO radio channel has a coherence time, a coherence bandwidth and a coherence length, a spacing between the first transmit antenna and the second transmit antenna being less than the coherence length, and
- no reference symbol is provided by the first transmit antenna within the coherence time or the coherence bandwidth.

14. The method of claim 13, further comprising processing estimates of a multiplicity of radio channels based on the spatial property of the MIMO radio channel to obtain the first radio channel estimate for a time slot for which no reference symbol was provided.

15. A transmitter apparatus for enabling radio channel estimation of a MIMO (MIMO=Multiple Input Multiple Output) radio channel, the MIMO radio channel extending between at least a first transmit antenna, a second transmit antenna and a receive antenna, the MIMO radio channel having a coherence time, a coherence bandwidth and a coherence length, the spacing between the first transmit antenna and the second transmit antenna being less than the coherence length, comprising:
- a transmitter for transmitting a first reference symbol on the first transmit antenna at a first time instant on a carrier frequency and for transmitting a second reference symbol on the second transmit antenna at a second time instant on the carrier frequency,
- wherein the first and the second time instants are separated by more than the coherence time and transmission of reference symbols on the first transmit antenna and on the second transmit antenna is suspended between the first and the second time instants and within the coherence bandwidth from the carrier frequency.

16. A system comprising a radio channel estimator according to claim 1 and the transmitter apparatus according to claim 15.

17. A method for enabling radio channel estimation of a MIMO (MIMO=Multiple Input Multiple Output) radio channel, the MIMO radio channel extending between at least a first transmit antenna, a second transmit antenna and a receive antenna, the MIMO radio channel having a coherence time, a coherence bandwidth and a coherence length, the spacing between the first transmit antenna and the second transmit antenna being less than the coherence length, comprising:
- transmitting a first reference symbol on the first transmit antenna at a first time instant on a carrier frequency; and
- transmitting a second reference symbol on the second transmit antenna at a second time instant on the carrier frequency,
- wherein the first and the second time instants are separated by more than the coherence time and transmission of reference symbols on the first transmit antenna and on the second transmit antenna is suspended between the first and the second time instants and within the coherence bandwidth from the carrier frequency.

18. A non-transitory storage medium having stored thereon a computer program having a program code for performing a method, when the program code runs on a computer or processor, for estimating a first radio channel to obtain a first radio channel estimate, the first radio channel being comprised in a MIMO radio channel (MIMO=Multiple Input Multiple Output) extending between at least a first transmit antenna, a second transmit antenna and a receive antenna, the first radio channel extending between the first transmit antenna and the receive antenna, the method comprising:
- receiving a reference symbol transmitted by the second transmit antenna; estimating a second radio channel based on the reference symbol, the second radio channel extending between the second transmit antenna and the receive antenna; and
- processing the estimate of the second radio channel based on a spatial property of the MIMO radio channel to obtain the first radio channel estimate, wherein
- the MIMO radio channel has a coherence time, a coherence bandwidth and a coherence length, a spacing between the first transmit antenna and the second transmit antenna being less than the coherence length, and
- no reference symbol is provided by the first transmit antenna within the coherence time or the coherence bandwidth.

19. The non-transitory storage medium of claim 18, the method further comprising processing estimates of a multiplicity of radio channels based on the spatial property of the MIMO radio channel to obtain the first radio channel estimate for a time slot for which no reference symbol was provided.

20. A non-transitory storage medium having stored thereon a computer program having a program code for performing a method, when the program code runs on a computer or processor, for enabling radio channel estimation of a MIMO (MIMO=Multiple Input Multiple Output) radio channel, the MIMO radio channel extending between at least a first transmit antenna, a second transmit antenna and a receive antenna, the MIMO radio channel having a coherence time, a coherence bandwidth and a coherence length, the spacing between the first transmit antenna and the second transmit antenna being less than the coherence length, the method comprising:
- transmitting a first reference symbol on the first transmit antenna at a first time instant on a carrier frequency; and
- transmitting a second reference symbol on the second transmit antenna at a second time instant on the carrier frequency,
- wherein the first and the second time instants are separated by more than the coherence time and transmission of reference symbols on the first transmit antenna and on the second transmit antenna is suspended between the first and the second time instants and within the coherence bandwidth from the carrier frequency.

* * * * *